(12) United States Patent
Nakao et al.

(10) Patent No.: US 9,362,759 B2
(45) Date of Patent: Jun. 7, 2016

(54) BATTERY CONTROL CIRCUIT AND BATTERY DEVICE

(75) Inventors: Ryouhei Nakao, Mito (JP); Youhei Kawahara, Hitachi (JP); Akihiko Kudou, Hitachinaka (JP); Akihiko Emori, Hitachi (JP); Kei Sakabe, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 361 days.

(21) Appl. No.: 13/807,487

(22) PCT Filed: Feb. 28, 2011

(86) PCT No.: PCT/JP2011/054466
§ 371 (c)(1),
(2), (4) Date: Dec. 28, 2012

(87) PCT Pub. No.: WO2012/002002
PCT Pub. Date: Jan. 5, 2012

(65) Prior Publication Data
US 2013/0106356 A1    May 2, 2013

(30) Foreign Application Priority Data

Jun. 28, 2010 (JP) ................................. 2010-146734

(51) Int. Cl.
*H02J 7/00* (2006.01)
*B60L 11/18* (2006.01)
(Continued)

(52) U.S. Cl.
CPC ............ *H02J 7/0021* (2013.01); *B60L 11/1864* (2013.01); *B60L 11/1866* (2013.01); *H01M 10/4207* (2013.01); *H01M 10/48* (2013.01);
*H02J 7/0016* (2013.01); *B60L 2200/26* (2013.01); *H01M 2010/4271* (2013.01); *H02J 7/044* (2013.01); *Y02T 10/7005* (2013.01); *Y02T 10/7055* (2013.01); *Y02T 10/7061* (2013.01)

(58) Field of Classification Search
CPC ............ H02J 7/004; H01M 2010/4271; B60L 11/1861
USPC .................. 320/116, 118, 119, 124, 132, 135
See application file for complete search history.

(56) References Cited

U.S. PATENT DOCUMENTS 5,811,890 A * 9/1998 Hamamoto ...................... 307/66
5,920,179 A * 7/1999 Pedicini .......................... 320/122
(Continued)

FOREIGN PATENT DOCUMENTS

JP    2002-354698 A    12/2002
JP    2003-282159 A    10/2003
(Continued)

*Primary Examiner* — Helen Rossoshek
(74) *Attorney, Agent, or Firm* — Volpe and Koenig, P.C.

(57) ABSTRACT

In a battery device including a battery pack in which a plurality of cells are connected in series, there are provided a battery control circuit or a battery device capable of eliminating a fluctuation in the voltage or charged state which can occur between the cells, or preventing the cells from being maintained in an over-charged state for a long period. A plurality of cell groups each including a plurality of cells are connected in series to form a battery pack. Cell controller is provided to the respective cell groups operate with electricity supplied from the cell groups allocated thereto so as to monitor and control the state of the cells of the cell group. Battery pack controller controls the cell controller based on information from the plurality of cell controller.

20 Claims, 34 Drawing Sheets

(51) Int. Cl.
*H01M 10/48* (2006.01)
*H01M 10/42* (2006.01)
*H02J 7/04* (2006.01)

(56) References Cited

U.S. PATENT DOCUMENTS

| | | | | |
|---|---|---|---|---|
| 6,025,695 | A * | 2/2000 | Friel et al. | 320/106 |
| 6,060,864 | A * | 5/2000 | Ito et al. | 320/136 |
| 6,208,117 | B1 * | 3/2001 | Hibi | 320/134 |
| 6,388,426 | B1 * | 5/2002 | Yokoo et al. | 320/136 |
| 6,501,250 | B2 * | 12/2002 | Bito | B60K 6/48 320/152 |
| 6,507,169 | B1 * | 1/2003 | Holtom | B60L 3/0046 320/106 |
| 6,549,014 | B1 * | 4/2003 | Kutkut | G01R 1/203 320/132 |
| 7,525,285 | B2 * | 4/2009 | Plett | 320/132 |
| 7,528,581 | B2 * | 5/2009 | Miyazaki et al. | 320/163 |
| 7,583,053 | B2 * | 9/2009 | Kamohara | 320/106 |
| 7,782,014 | B2 * | 8/2010 | Sivertsen | B60L 11/1866 320/118 |
| 7,911,178 | B2 * | 3/2011 | Kawata et al. | 320/116 |
| 8,103,401 | B2 * | 1/2012 | Kubo et al. | 701/34.1 |
| 8,207,704 | B2 * | 6/2012 | Kai et al. | 320/116 |
| 8,212,571 | B2 * | 7/2012 | Emori et al. | 324/522 |
| 8,330,421 | B2 * | 12/2012 | Nakanishi | 320/132 |
| 8,350,529 | B2 * | 1/2013 | Loncarevic | H02J 7/0016 320/118 |
| 8,487,590 | B2 * | 7/2013 | Kudo et al. | 320/163 |
| 8,518,570 | B2 * | 8/2013 | Kudo et al. | 429/91 |
| 8,723,527 | B2 * | 5/2014 | Kudo et al. | 324/433 |
| 8,736,229 | B2 * | 5/2014 | Kawahara et al. | 320/116 |
| 2003/0232237 | A1 * | 12/2003 | Nakagawa et al. | 429/61 |
| 2004/0048118 | A1 * | 3/2004 | Nakaji et al. | 429/22 |
| 2004/0164706 | A1 * | 8/2004 | Osborne | H02J 7/0018 320/116 |
| 2006/0238165 | A1 * | 10/2006 | Moore et al. | 320/118 |
| 2008/0239628 | A1 | 10/2008 | Tatebayashi et al. | |
| 2008/0309288 | A1 * | 12/2008 | Benckenstein et al. | 320/119 |
| 2009/0015206 | A1 * | 1/2009 | Seman, Jr. | H02J 7/0019 320/134 |
| 2009/0021222 | A1 * | 1/2009 | Kudo et al. | 320/160 |
| 2009/0085516 | A1 * | 4/2009 | Emori et al. | 320/118 |
| 2009/0289599 | A1 * | 11/2009 | White et al. | 320/120 |
| 2010/0001737 | A1 * | 1/2010 | Kubo et al. | 324/434 |
| 2010/0052614 | A1 * | 3/2010 | Mariels | H02J 7/0016 320/116 |
| 2010/0194339 | A1 * | 8/2010 | Yang | H02J 7/0016 320/116 |
| 2010/0264878 | A1 * | 10/2010 | Ueda et al. | 320/116 |
| 2010/0320969 | A1 * | 12/2010 | Sakakibara et al. | 320/118 |
| 2010/0321025 | A1 * | 12/2010 | Lin | H01M 10/441 324/427 |
| 2011/0084663 | A1 * | 4/2011 | Troxel et al. | 320/118 |
| 2011/0204898 | A1 * | 8/2011 | Kim | G01R 19/2506 324/434 |
| 2011/0234170 | A1 * | 9/2011 | Zhang | H02J 7/0016 320/134 |
| 2011/0298424 | A1 * | 12/2011 | Yamauchi et al. | 320/118 |
| 2012/0025769 | A1 * | 2/2012 | Kikuchi | B60L 3/0046 320/118 |
| 2012/0046893 | A1 * | 2/2012 | Kaneko | G01R 31/3658 702/63 |
| 2012/0141848 | A1 * | 6/2012 | Nagaoka et al. | 429/92 |
| 2012/0235483 | A1 * | 9/2012 | Rigby | H01M 10/482 307/29 |
| 2014/0159671 | A1 * | 6/2014 | Kawahara et al. | 320/134 |
| 2015/0231985 | A1 * | 8/2015 | Li | B60L 11/1862 320/134 |

FOREIGN PATENT DOCUMENTS

| | | |
|---|---|---|
| JP | 2005-328603 A | 11/2005 |
| JP | 2007-244058 A | 9/2007 |
| JP | 2008-245480 A | 10/2008 |

* cited by examiner (a)

(b)

(a)

(b)

BATTERY CONTROL CIRCUIT AND BATTERY DEVICE

TECHNICAL FIELD

The present invention relates to a control circuit for a plurality of batteries that constitutes a battery unit and to a battery device.

BACKGROUND ART

In general, in a battery device that is mounted on an electric vehicle (EV), a plug-in hybrid vehicle (PHEV), and a hybrid vehicle (HEV), a plurality of batteries are connected in series to form a battery unit. Here, when individual differences between batteries such as a capacitance fluctuation or a self-discharge fluctuation between batteries occurs, a fluctuation in the charged state (State of Charge: SOC) of each battery included in the battery device may occur. When this fluctuation occurs, charge control is performed based on a battery having the highest SOC among the plurality of batteries, and discharge control is performed based on a battery having the lowest SOC. Thus, the energy that can be used by the battery unit decreases. Moreover, when it is expected that the usable SOC changes over a wide range as in a PHEV or EV, deterioration of a battery is likely to progress in a high or low SOC state. Thus, it is necessary to take countermeasures to decrease the SOC when the SOC is too high or to prevent a further decrease in the SOC when the SOC is too low. Therefore, a method of eliminating an SOC fluctuation between batteries which may occur when a plurality of batteries are connected in series is proposed. In this method, a voltage equalization circuit made up of a bypass resistor and a bypass switch connected in parallel to the battery and battery control means for monitoring a battery state are mounted, and the battery control means controls the bypass switch of the equalization circuit based on a voltage fluctuation amount. That is, the method forcibly discharges a battery having a high voltage to equalize voltages.

However, when a battery having a large capacity is required, in particular, there is a limit in the equalization only during the operation of a battery device depending on the degree of a voltage fluctuation. That is, the greater the voltage fluctuation, the longer the voltage equalization. Thus, a scheme in which voltage equalization is executed even after the battery device stops operating in addition to during the operation of the battery device is discussed. As an example of such a scheme, JP-A-2002-354698 discloses a method of periodically activating the battery control means during the stop period of the battery device to control the turn on/off of the bypass switch of the voltage equalization circuit to discharge a battery having a high SOC to realize voltage equalization. Moreover, JP-A-2005-328603 discloses a method of activating the voltage equalization circuit for a predetermined period with electricity from the battery even during the stop period of the battery device to control the turn on/off of the bypass switch to discharge a discharge target battery.

CITATION LIST

Patent Literature

[PTL 1] JP-A-2002-354698
[PTL 2] JP-A-2005-328603

SUMMARY OF INVENTION

Technical Problem

The above-described battery device is preferably capable of realizing control with a simple process and a smaller number of commands while suppressing energy loss of the battery unit as much as possible. Moreover, when the SOC of a battery is high, and it is desired to decrease the SOC at an early stage, it is important to discharge the battery with a larger current as compared to a normal case.

An object of the present invention is to provide a battery control circuit and a battery device capable of solving the above-described problems.

Solution to Problem

The present invention provides a battery device that includes battery control means that operates with electricity supplied from batteries so as to monitor the state of the batteries, in which a battery control circuit that monitors the battery having a high SOC operates in a normal operation mode until a predetermined condition is satisfied even when the battery device stops. Specifically, a management unit that manages a period required for the voltage of a discharge target battery to reach an intended voltage or for an SOC of the discharge target battery to reach an intended SOC is provided to the battery control means. After the operation of the battery device stops, by allowing the battery control means that monitors the battery having a high SOC in the normal operation mode to operate based on the information from the management unit, it is possible to perform the discharge of the battery having a high SOC. That is, by allowing the battery control means to operate after the operation of the battery device stops, it is possible to decrease the SOC. When the period required for the voltage of the discharge target battery to reach an intended voltage or for the SOC of the discharge target battery to reach an intended SOC has elapsed, the battery control means transition to the power-saving mode sequentially starting with the battery control means that monitors the battery.

The battery unit is formed by electrically connecting the plurality of batteries in series. One battery control means may be provided to each of the battery groups in which the plurality of batteries are connected in series, and may be provided to each of the batteries.

Moreover, battery unit control means that controls the respective battery control means based on the information from the plurality of battery control means is provided. The battery unit control means determines a discharge ending condition of the batteries that are monitored by the plurality of battery control means, transmits the discharge ending condition to the respective battery control means, and then proceeds to a power-saving mode.

Advantageous Effects of Invention

According to the present invention, it is possible to realize a battery control circuit or a battery device control method capable of suppressing energy loss of a battery unit as much as possible with a simple process and a small number of commands.

DESCRIPTION OF EMBODIMENTS

Hereinafter, embodiments of the present invention will be described with reference to drawings. In the following embodiments, a case where the present invention is applied to a battery device that constitutes a power supply of a plug-in hybrid vehicle (PHEV) is described as an example. However, the present invention can be applied to a battery control circuit of a battery device that constitutes a power supply of automobiles such as a hybrid vehicle (HEV) or an electric vehicle (EV) and industrial vehicles such as a hybrid railroad vehicle.

Moreover, in the following embodiments, a case where a lithium-ion battery is applied to a battery that constitutes a battery unit is described as an example. However, in addition to the above, a nickel-metal hydride battery, a nickel-zinc battery, an electric double layer capacitor, a hybrid capacitor, or the like can be used as the battery. In the following embodiments, a battery pack corresponds to a battery unit, a cell corresponds to a battery, a cell group corresponds to a battery group, cell control means corresponds to battery control means, and battery pack control means corresponds to battery unit control means. The cell control means and the battery pack control means are realized as an integrated circuit on a circuit board.

First Embodiment

A first embodiment of the present invention will be described with reference to FIGS. 1 to 13.

Figure 1:
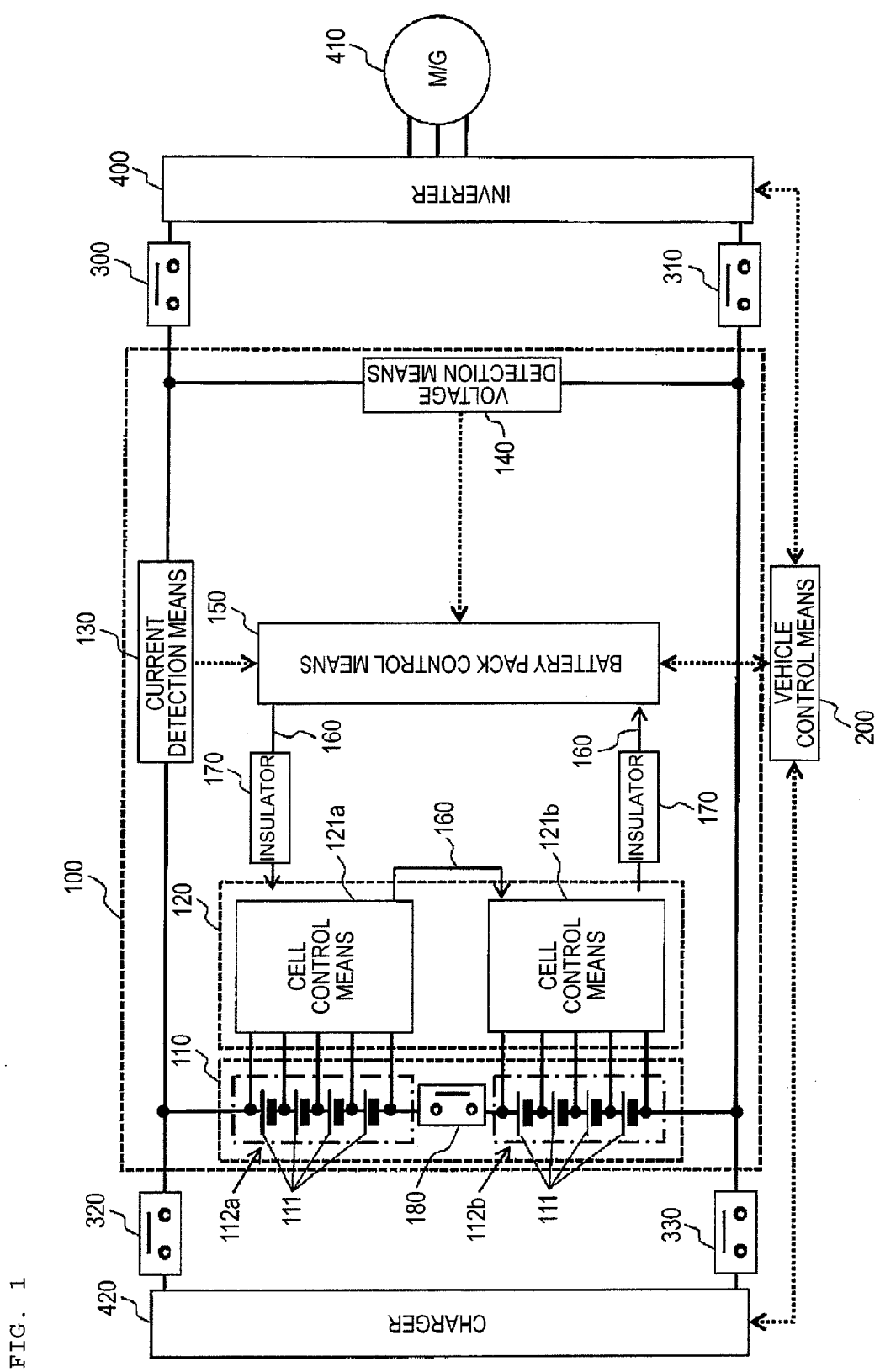
FIG. 1 is a block diagram illustrating a configuration example of a battery device of a plug-in hybrid vehicle according to the present invention.

FIG. 1 illustrates a configuration example of a battery device of a plug-in hybrid vehicle according to the present embodiment.

First, a configuration of a battery device 100 will be described. The battery device 100 includes a battery pack 110 that includes a plurality of cells 111, cell management means 120 that monitors the state of the cell 111, current detection means 130 that detects a current flowing in the battery device 100, voltage detection means 140 that detects a total voltage of the battery pack 110, and battery pack control means 150 that controls the battery pack 110. The battery pack control means 150 receives a cell voltage and a temperature of the cell 111 transmitted from the cell management means 120, a current value flowing in the battery device 100 transmitted from the current detection means 130, and a total voltage value of the battery pack 110 transmitted from the voltage detection means 140, and detects the state of the battery pack 110 based on the input information. Moreover, the results of the process performed by the battery pack control means 150 are transmitted to the cell management means 120 and vehicle control means 200.

The vehicle control means 200 controls an inverter 400 connected to the battery device 100 via relays 300 and 310 and a charger 420 connected via relays 320 and 330 based on the information transmitted from the battery pack control means 150. During travelling of the vehicle, the battery device 100 is connected to the inverter 400 and drives a motor generator 410 based on the energy stored in the battery pack 110. During charging of the vehicle, the battery device 100 is connected to the charger 420 and is charged by the electricity supplied from a household power supply or an electricity station.

Figure 3:
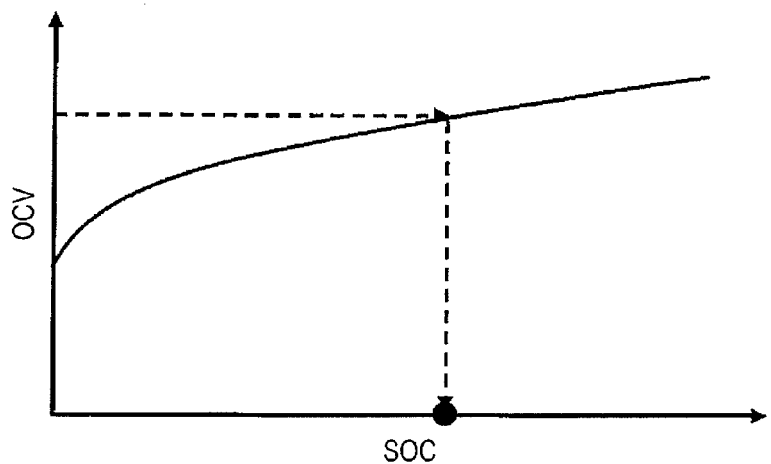
FIG. 3 is a characteristic diagram illustrating a correlation between SOC and OCV.

The battery pack 110 has a configuration in which a plurality of cells 111 (lithium-ion batteries) capable of storing and emitting electric energy (capable of charging and discharging DC electricity) are electrically connected in series. Although a case where one cell 111 has an output voltage of 3.0 V to 4.2 V (average output voltage: 3.6 V), and an OCV (Open Circuit Voltage) and an SOC of the cell 111 have such a correlation as illustrated in FIG. 3 is described as an example, another voltage specification may be employed.

The cells 111 that constitute the battery pack 110 are grouped by a predetermined unit number when managing and controlling the state thereof. The grouped cells 111 are electrically connected in series to form cell groups 112*a* and 112*b*. The predetermined number may be the same number such as 1, 4, 6, or the like and may be a combination of numbers such as a combination of 4 and 6. Moreover, the high potential-side cell group 112*a* and the low potential-side cell group 112*b* are electrically connected in series via a service disconnector 180 for maintenance and checking in which a switch and a fuse are connected in series.

The cell management means 120 that monitors the state of the cells 111 that constitute the battery pack 110 includes a plurality of cell control means 121*a* and 121*b*, and one of the cell control means 121*a* and 121*b* is allocated to one of the cell groups 112*a* and 112*b* that are grouped in the above-described manner. The cell control means 121*a* and 121*b* operate by receiving electricity from the cell groups 112*a* and 112*b*, to which the cell control means are allocated, and monitor and control the state of the cells 111 that constitute the cell groups 112*a* and 112*b*.

In the present embodiment, in order to simplify the description, the battery pack 110 includes eight cells 111 in total, four cells 111 each are electrically connected in series to form two cell groups 112*a* and 112*b*, and the cell groups are electrically connected in series via the service disconnector 180. Moreover, the cell control means 121*a* and 121*b* for monitoring the state of the cells 111 are provided in the cell groups 112*a* and 112*b*, respectively.

The battery pack control means 150 receives a plurality of signals including a measurement value of a cell voltage and a temperature of the cell 111 output from the cell management means 120, a diagnosis result on whether the cell 111 is over-charged or over-discharged, an abnormality signal output when a communication error or the like occurs in the cell management means 120, a current value from the current detection means 130, a total voltage value of the battery pack 110 output from the voltage detection means 140, and a signal output from the vehicle control means 200 which is a high-level control device. Here, the battery pack control means 150 executes computation of the SOC of the cell 111, computation for performing voltage equalization control including discharge ending conditions described later, and computation for controlling a charge and discharge amount based on the input information, an internal resistance of the cell 111 stored in advance, and a relationship (FIG. 3) between the SOC and the OCV. Moreover, the battery pack control means 150 outputs the computation results and commands based on the computation results to the cell management means 120 and the vehicle control means 200.

The battery pack control means 150 and the cell management means 120 transmit and receive signals with the aid of signal communication means 160 via an insulator 170 such as a photo-coupler. The reason why the insulator 170 is provided is because the operation power supplies of the battery pack control means 150 and the cell management means 120 are different. That is, the cell management means 120 operates with electricity received from the battery pack 110, whereas the battery pack control means 150 uses an in-vehicle auxiliary battery (for example, a 14V battery) as a power supply. The insulator 170 may be mounted on a circuit board that constitutes the cell management means 120, and may be mounted on a circuit board that constitutes the battery pack control means 150. Naturally, the cell management means 120 and the battery pack control means 150 may be mounted on one circuit board. Depending on the system configuration, the insulator 170 may be not provided.

Communication means between the battery pack control means 150 and the cell control means 121*a* and 121*b* according to the present embodiment will be described. The cell control means 121*a* and 121*b* are connected in series in the order of the potentials of the cell groups 112*a* and 112*b* that are monitored by the cell control means 121*a* and 121*b*. The signal transmitted by the battery pack control means 150 is input to the cell control means 121*a* with the aid of the signal communication means 160 via the insulator 170. The output of the cell control means 121*a* and the input of the cell control means 121*b* are similarly connected by the signal communication means 160, and signal transmission is performed. In the present embodiment, although the insulator 170 is not interposed between the cell control means 121*a* and the cell control means 121*b*, the insulator 170 may be interposed therebetween. Moreover, the output of the cell control means 121*b* is transmitted by the signal communication means 160 through the input of the battery pack control means 150 via the insulator 170. In this way, the battery pack control means 150, the cell control means 121*a*, and the cell control means 121*b* are connected in a loop form by the signal communication means 160. This loop connection is sometimes referred to as daisy chain connection, bunching connection, or one-after-another connection.

Figure 2:
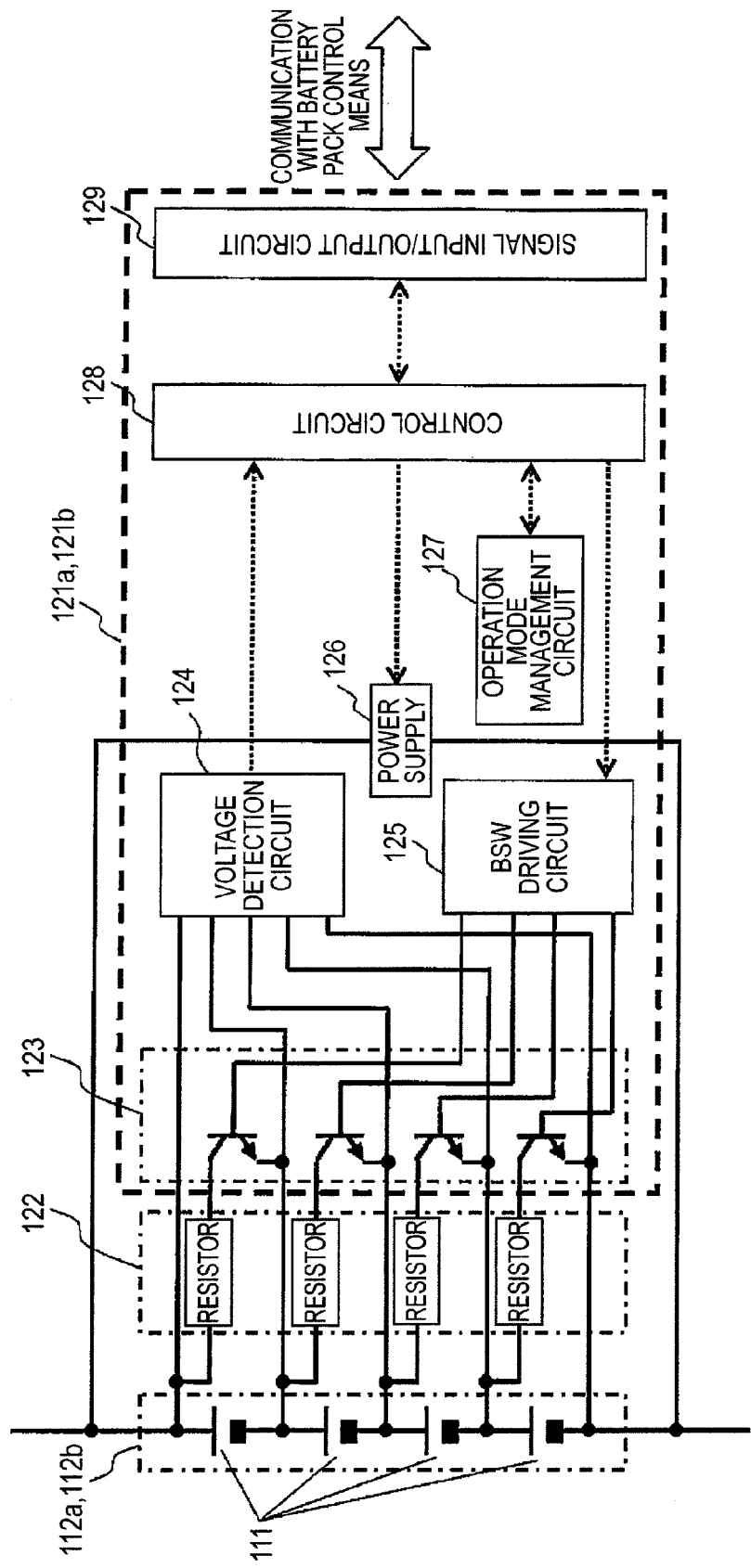
FIG. 2 is a block diagram illustrating a circuit configuration example of cell control means.

FIG. 2 illustrates a circuit configuration of the cell control means 121*a* and 121*b* according to the present embodiment. The cell management means 121*a* and 121*b* include a voltage equalization circuit that includes a bypass resistor 122 and a bypass switch 123, a BSW driving circuit 125 that drives the bypass switch 123, a voltage detection circuit 124 that measures a cell voltage of the cell 111 to be managed, a power supply 126 for operating the cell control means 121*a* and 121*b*, an operation mode management circuit 127 that stores a power-saving mode (low current consumption mode) transition condition for the cell control means 121 that monitors the respective cells 111, computed by the battery pack control means 150, a control circuit 128 that controls the cell control means 121*a* and 121*b* based on the information from the battery pack control means 150, and a signal input/output circuit 129 that transmits and receives signals to and from the battery pack control means 150 or a neighboring cell control means 121.

The power-saving mode is an operation mode in which consumption current is smaller than that of a normal mode. In the power-saving mode, for example, only some of a plurality of functions of the cell control means 121a and 121b is operated so that energy supplied from the cell groups 112a and 112b can be decreased as compared to the normal mode. As an example, in the power-saving mode, the cell control means 121 operates only functions that can transition to the normal mode according to communication from the outside, and supplies electricity to at least the signal input/output circuit 129 and the control circuit 128. The cell control means 121 having transitioned to the power-saving mode can transition to the normal mode according to a command from the battery pack control means 150.

The power-saving mode transition condition computed by the battery pack control means 150 is stored in the operation mode management circuit 127. Specifically, a target voltage value and a period required for reaching the target value are stored in the operation mode management circuit 127, details of which will be described later.

The control circuit 128 receives a voltage acquisition command and equalization control information transmitted from the battery pack control means 150 via the signal input/output circuit 129 and outputs a cell voltage detected by the voltage detection circuit 124 and information based on the cell voltage to the signal input/output circuit 129. Before the battery device stops an operation, the transition condition for transition to the power-saving mode is input from the battery pack control means 150, and the power-saving mode transition condition is stored in the operation mode management circuit 127. Moreover, the control circuit 128 controls the BSW driving circuit 125 and the power supply 126 based on the detected cell voltage and the power-saving mode transition condition stored in the operation mode management circuit 127.

In the present embodiment, discharge can be performed using two methods of discharge means 1 and discharge means 2 described below. Hereinafter, details of the respective discharge means will be described.

During stopping of the battery device, the discharge means 1 maintains the cell control means 121 that monitors the cell group 112 to be discharged in the normal operation mode to thereby discharge the cell group 112 so as to reach an intended voltage (target OCV) or SOC (target SOC). The target OCV or the target SOC is a predetermined voltage or SOC which is set in order to eliminate a state where any one of the plurality of cells 111 that constitute the battery pack 110, for example, is over-charged, details of which will be described later.

As described above, during stopping of the battery device 100, the cell control means 121 is operated in the normal operation mode until all cell groups 112 reach the target OCV or the target SOC, and the cell control means 121 are put into the power-saving mode sequentially starting with the cell control means 121 in which discharge by the discharge means 1 ends. In the present embodiment, the battery pack control means 150 transmits a discharge ending condition 1 to the cell control means 121 and the operation mode management circuit 127 stores the discharge ending condition. However, the discharge ending condition 1 may be transmitted from another controller to the cell control means 121.

The discharge ending condition 1 will be described. In description of a computation formula for determining the discharge ending condition 1, it is assumed that the number 8 of the cells 111 is N, the number 2 of the cell groups 112 is M, and the number 4 of the cells 111 that constitute the cell group 112 is L (=N/M).

Two methods of determining the discharge ending condition 1 can be considered. The first method is to determine the discharge ending condition 1 based on the cell voltage of the cell 111. The second method is to compute a period required for transitioning to the power-saving mode and determining the discharge ending condition 1 based on the computation result. In the present embodiment, although the above two methods are described for the discharge ending condition 1, a method of determining the discharge ending condition 1 is not limited to the above two methods.

The first method of determining the discharge ending condition 1 according to the present embodiment will be described.

The cell 111 having the smallest OCV among the plurality of cells 111 that constitute the cell group 112 is computed for each cell group 112 according to Expression (1-1).

[Mathematical Formula 1]

$$\left.\begin{aligned} OCV\mathrm{min}_1 &= \mathrm{MIN}(OCV_{11}, OCV_{12}, OCV_{13}, \cdots, OCV_{1L}) \\ OCV\mathrm{min}_2 &= \mathrm{MIN}(OCV_{21}, OCV_{22}, OCV_{23}, \cdots, OCV_{2L}) \\ OCV\mathrm{min}_3 &= \mathrm{MIN}(OCV_{31}, OCV_{32}, OCV_{33}, \cdots, OCV_{3L}) \\ &\vdots \\ OCV\mathrm{min}_M &= \mathrm{MIN}(OCV_{M1}, OCV_{M2}, OCV_{M3}, \cdots, OCV_{ML}) \end{aligned}\right\} \quad (1\text{-}1)$$

The OCVmin obtained by Expression (1-1) is compared with an intended OCV (target OCV), and the cell group 112 having a cell 111 of which the OCVmin is higher than the target OCV is determined as a discharge target cell group. Moreover, during stopping of the battery device 100, the target cell group 112 is discharged with a consumption current in the normal operation mode of the cell control means 121. When the minimum voltage value of the discharge target cell group 112 is the same as the target OCV, it is determined that discharge has ended, and the cell control means 121 transitions from the normal operation mode to the power-saving mode.

The second method of determining the discharge ending condition 1 according to the present embodiment will be described.

In the second method of determining the discharge ending condition 1, the period required for securing a predetermined discharge amount is calculated, the cell control means 121 operates in the normal operation mode until the calculated period elapses during stopping of the battery device 100, and the cell control means 121 transitions to the power-saving mode when the calculated period has elapsed, and the discharge ends. Thus, in this method, time measuring means such as a timer is provided in the cell control means 121 in order to determine whether the calculated period has elapsed.

First, the SOC is estimated based on a correlation between SOC and OCV from the OCV measurement results (Expression (1-1)) of all cells 111, and the SOC (SOCmin) of the cell 111 having the smallest SOC among the cells 111 that constitute the cell group 112 is detected for each cell group 112 using Expression (2-1). Hereinafter, the smallest SOCs of the respective cell groups 112 will be referred to as $SOC\mathrm{min}_1, \ldots,$ and $SOC\mathrm{min}_M$.

[Mathematical Formula 2]

$$\left.\begin{aligned} SOC\mathrm{min}_1 &= \mathrm{MIN}(SOC_{11}, SOC_{12}, \cdots, SOC_{1L}) \\ SOC\mathrm{min}_2 &= \mathrm{MIN}(SOC_{21}, SOC_{22}, \cdots, SOC_{2L}) \\ SOC\mathrm{min}_3 &= \mathrm{MIN}(SOC_{31}, SOC_{32}, \cdots, SOC_{3L}) \\ &\vdots \\ SOC\mathrm{min}_M &= \mathrm{MIN}(SOC_{M1}, SOC_{M2}, \cdots, SOC_{ML}) \end{aligned}\right\} \quad (2\text{-}1)$$

A difference ΔSOC1 between the SOCmin calculated according to Expression (2-1) and the intended SOC (target SOC) is calculated according to Expression (2-2) below.

[Mathematical Formula 3]

$$\left.\begin{array}{l}\Delta SOC1_1 = SOC\text{min}_1 - \text{Target } SOC\\ \Delta SOC1_2 = SOC\text{min}_2 - \text{Target } SOC\\ \Delta SOC1_3 = SOC\text{min}_3 - \text{Target } SOC\\ \vdots\\ \Delta SOC1_M = SOC\text{min}_M - \text{Target } SOC\end{array}\right\} \quad (2\text{-}2)$$

A period t1 required for adjustment is calculated from the calculated ΔSOC1 according to Expression (2-3) below.

[Mathematical Formula 4]

$$\left.\begin{array}{l}t1_1 = (\Delta SOC1_1 \times Q\text{max}_1)/I_c\\ t1_2 = (\Delta SOC1_2 \times Q\text{max}_2)/I_c\\ t1_3 = (\Delta SOC1_3 \times Q\text{max}_3)/I_c\\ \vdots\\ t1_M = (\Delta SOC1_M \times Q\text{max}_M)/I_c\end{array}\right\} \quad (2\text{-}3)$$

Here, Qmax represents a full charge capacity [Ah] of the cell 111, and $I_C$ represents a consumption current [A] of the cell control means 121. During stopping of the battery device 100, the cell control means 121 maintains the operation in the normal operation mode for the period t1 based on the result of Expression (2-3), whereby the cell group 112 to be discharged is discharged with the consumption current in the normal operation mode of the cell control means 121, and the discharge ends when the period t1 has elapsed. That is, the cell control means 121 transition to the power-saving mode sequentially starting with the cell control means 121 in which the period t1 has elapsed.

Figure 4:
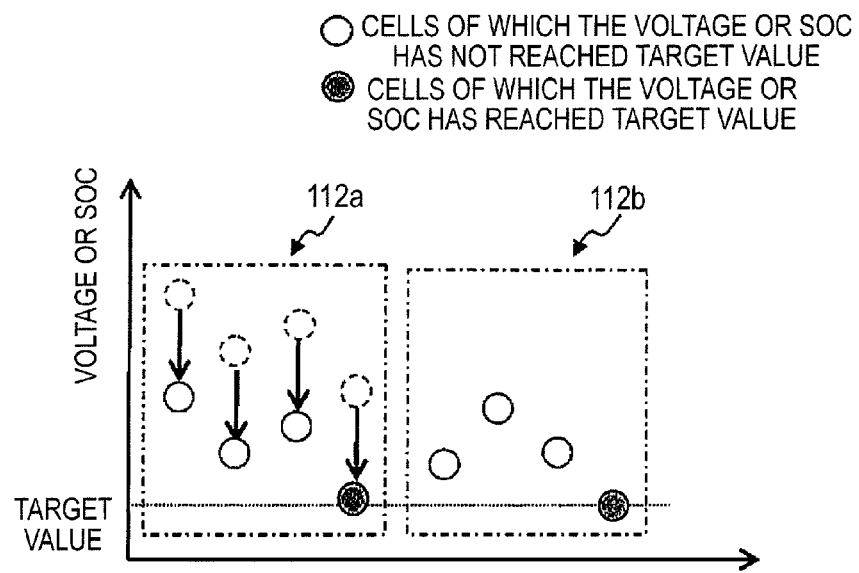
FIG. 4 is a diagram for explaining SOC equalization by discharge means 1.

A change of the SOC according to the discharge means 1 will be described with reference to FIG. 4. In the discharge means 1, the SOC of the cell 111 having the smallest voltage among the respective cell groups 112 is extracted, and the cell control means 121 operates in the normal operation mode until the smallest SOCs of the respective cell groups 112 are the same. Since the cell group 112 has a configuration in which the cells 111 are connected in series, all cells 111 that constitute the cell group 112 are discharged by an amount corresponding to the consumption current of the cell control means 121. Thus, as illustrated in FIG. 4, the SOCs of the cells 111 that constitute the cell group 112 decrease uniformly, and the discharge means 1 ends when the smallest SOCs of the respective cell groups 112 are the same.

In this description, although the discharge ending condition 1 is determined using the smallest voltage value or the smallest SOC of the cells 111 that constitute the battery pack 110 as a target value, the present invention is not limited to this.

Next, the discharge means 2 will be described. The discharge means 2 according to the present embodiment is means that performs discharge the cell 111 having the highest voltage or SOC among the cells 111 that constitute the cell group 112 using the voltage equalization circuit that includes the bypass resistor 122 and the bypass switch 123. That is, the bypass switch 123 that is connected in parallel to the discharge target cell 111 is turned on, and the cell 111 is forcibly discharged using the bypass resistor 122 to decrease the voltage thereof to an intended voltage (target OCV) or SOC (target SOC). Here, as described above, the target OCV or the target SOC is a predetermined voltage or SOC which is set in order to eliminate a state where any one of the plurality of cells 111 that constitute the battery pack 110, for example, is over-charged, details of which will be described later. In the present embodiment, although two methods described below are described for a discharge ending condition 2, a method of determining the discharge ending condition 2 is not limited to the two methods below.

Two methods of determining the discharge ending condition 2 can be considered. A first method is to determine the discharge ending condition 2 based on the cell voltage of the cell 111 similarly to the discharge ending condition 1. The second method is to compute a period required for discharging the cell 111 and determining the discharge ending condition 2 based on the computation result.

The first method of determining the discharge ending condition 2 will be described. The cell voltage of each of the plurality of cells 111 that constitute the cell group 112 is detected and compared with the target OCV set for each of the respective cell groups 112, the cell 111 having a voltage higher than the target OCV is determined as the cell 111 to be discharged. The bypass switch 123 connected in parallel to the discharge target cell 111 is turned on, and the cell 111 is forcibly discharged. The discharge ends when the cell voltage of the discharge target cell 111 is the same as the target OCV.

The second method of determining the discharge ending condition 2 will be described. In the second method of determining the discharge ending condition 2, similarly to the discharge ending condition 1, the period required for securing a predetermined discharge amount is calculated, and the discharge ends when the calculated period has elapsed. Thus, in this method, time measuring means such as a timer is provided in the cell control means 121 in order to determine whether the calculated period has elapsed.

First, the SOC is estimated based on a correlation between SOC and OCV from the OCV measurement results of all cells 111, and a difference ΔSOC2 between the SOC and the target SOC of each of the respective cells 111 is calculated according to Expression (2-4) below.

[Mathematical Formula 5]

$$\left.\begin{array}{l}\Delta SOC2_{1X} = SOC_{1X} - \text{Target } SOC_1\\ \Delta SOC2_{2X} = SOC_{2X} - \text{Target } SOC_2\\ \Delta SOC2_{3X} = SOC_{3X} - \text{Target } SOC_3\\ \vdots\\ \Delta SOC2_{MX} = SOC_{MX} - \text{Target } SOC_M\\ (X = 1, 2, 3, \ldots, L)\end{array}\right\} \quad (2\text{-}4)$$

A period t2 required for adjustment is calculated from the calculated ΔSOC2 according to Expression (2-5) below.

[Mathematical Formula 6]

$$\left.\begin{array}{l}t2_{1X} = (\Delta SOC2_{1X} \times Q\text{max}_{1X})/I_B\\ t2_{2X} = (\Delta SOC2_{2X} \times Q\text{max}_{2X})/I_B\\ t2_{3X} = (\Delta SOC2_{3X} \times Q\text{max}_{3X})/I_B\\ \vdots\\ t2_{MX} = (\Delta SOC2_{MX} \times Q\text{max}_{MX})/I_B\\ (X = 1, 2, 3, \ldots, L)\end{array}\right\} \quad (2\text{-}5)$$

Here, Qmax represents a full charge capacity [Ah] of the cell 111, $I_B$ represents a bypass current [A] flowing in the bypass resistor, and X represents the number of each cell 111 that constitutes the cell group. The discharge target cell 111 is discharged based on the result of Expression (2-5), and the discharge ends when the period required for securing the predetermined discharge amount has elapsed.

Figure 5:
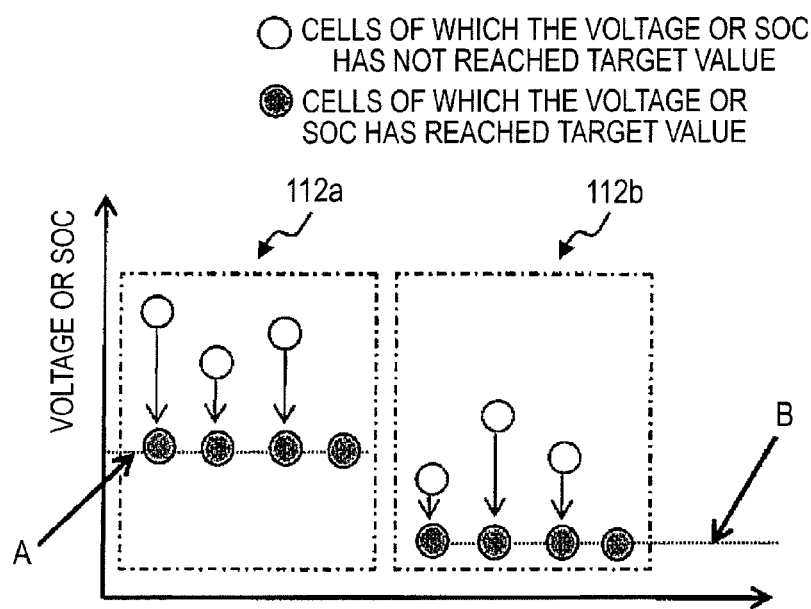
FIG. 5 is a diagram for explaining SOC equalization by discharge means 2.

A change of the SOC according to the discharge means 2 will be described with reference to FIG. 5. In the discharge means 2, the cell 111 having a high OCV is discharged using the equalization circuit so that the cell voltages of all cells 111 that constitute the cell group 112 is the same as the target value set for each cell group 112. In the case of the illustrated example, the target value of the cell group 112a is A, and the target value of the cell group 112b is B. Thus, as illustrated in FIG. 5, the cell voltage of the discharge target cell 111 among the cells 111 that constitute the cell group 112 decreases and the discharge means 2 ends when the cell voltages of all cells 111 that constitute the cell group 112 are the same as the target value.

In the present embodiment, it is also possible to eliminate a voltage fluctuation of the cells 111 that constitute the battery pack 110 to perform voltage equalization. In this case, the smallest voltage value or the smallest SOC value of the cells 111 that constitute the battery pack 110 may be set as the target value for ending the discharge by the discharge means 1. Moreover, the smallest voltage value or the smallest SOC value of the cells 111 managed by the cell control means 121 may be detected for each cell group 112 and may be set as the target value for the discharge by the discharge means 2.

Figure 6:
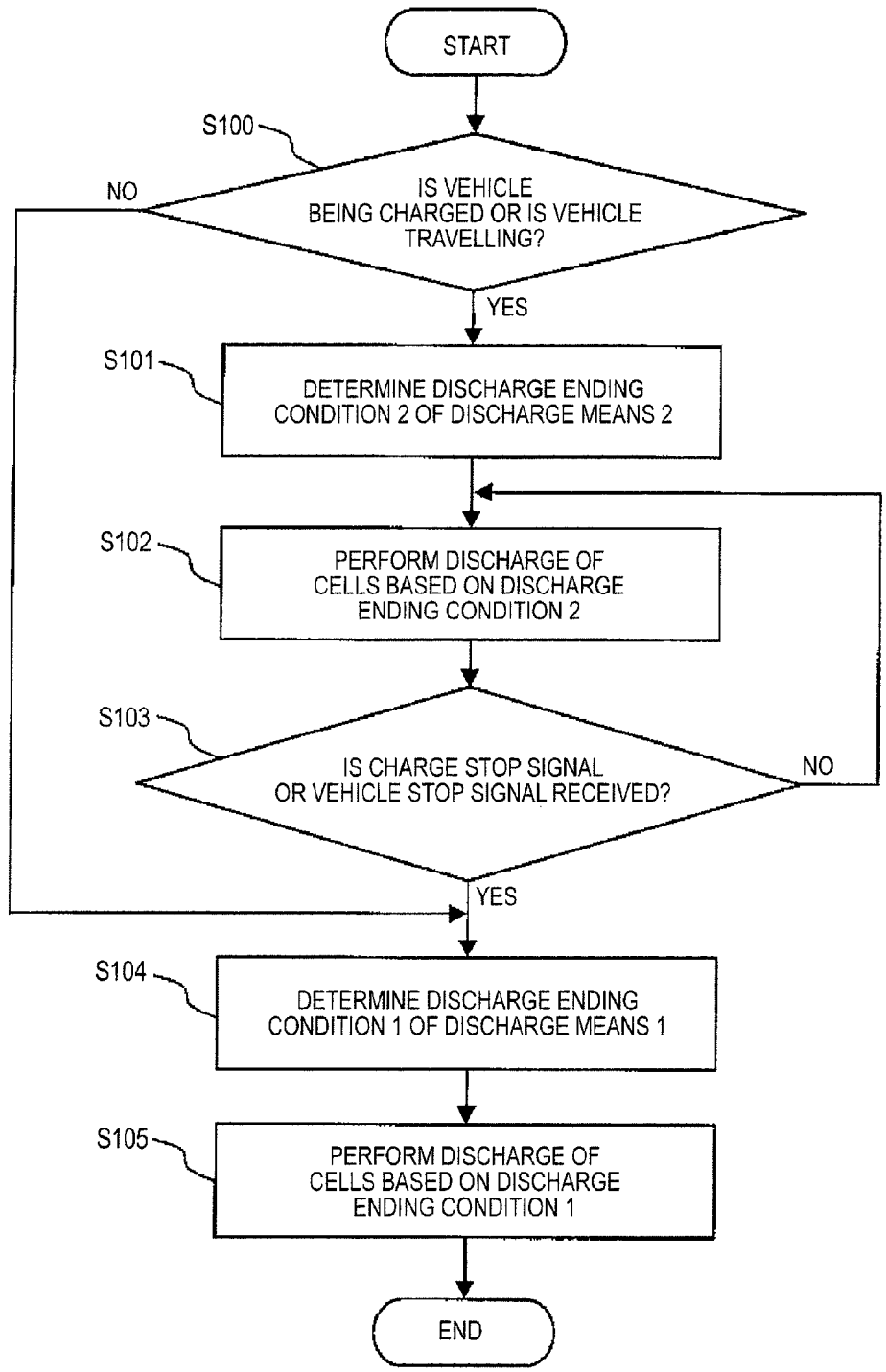
FIG. 6 is a flowchart for explaining an operation example of the battery device according to the present invention.

Subsequently, the flow of the operation of the battery device according to the present embodiment will be described with reference to the flowchart of FIG. 6.

In Step 100, it is determined whether the vehicle is being charged from the charger 420 or is travelling. When the vehicle is being charging or travelling, the flow proceeds to Step 101. When the vehicle is not being charging or travelling, the flow proceeds to Step 104.

In Step 101, the battery pack control means 150 determines the discharge ending condition 2 and transmits the discharge ending condition 2 to the cell control means 121, and then, the flow proceeds to Step 102. The flow of the operation of the battery pack control means 150 in Step 101 will be described later with reference to FIG. 7A.

In Step 102, the cell control means 121 discharges the cell 111 that is to be discharged by the discharge means 2. The flow of the operation of the cell control means 121 in Step 102 will be described later with reference to FIG. 8A.

In Step 103, it is determined whether the battery device has received a charge stop signal or a vehicle stop signal. When the charge stop signal or the vehicle stop signal has been received, the flow proceeds to Step 104. The vehicle stop signal is a signal indicating that the key switch of the vehicle is turned off, the vehicle stops, and the charge and discharge of the battery device 100 also stop. Moreover, in this description, even when the discharge is not ended in Step 102, when the vehicle stop signal is received, the flow proceeds to Step 104, and the discharge by the discharge means 2 ends. However, the process which has not been ended in Step 102 may be continuously performed even after the vehicle stops.

In Step 104, the battery pack control means 150 determines the discharge ending condition 1 for the voltage equalization using the consumption current of the cell control means 121 and transmits the discharge ending condition 1 to the cell control means 121, and then, the flow proceeds to Step 105. The flow of the operation of the battery pack control means 150 in Step 104 will be described later with reference to FIG. 7B.

In Step 105, the cell control means 121 performs voltage equalization based on the discharge ending condition 1. The flow of the operation of the cell control means 121 in Step 105 will be described later with reference to FIG. 8B.

Figure 7A:
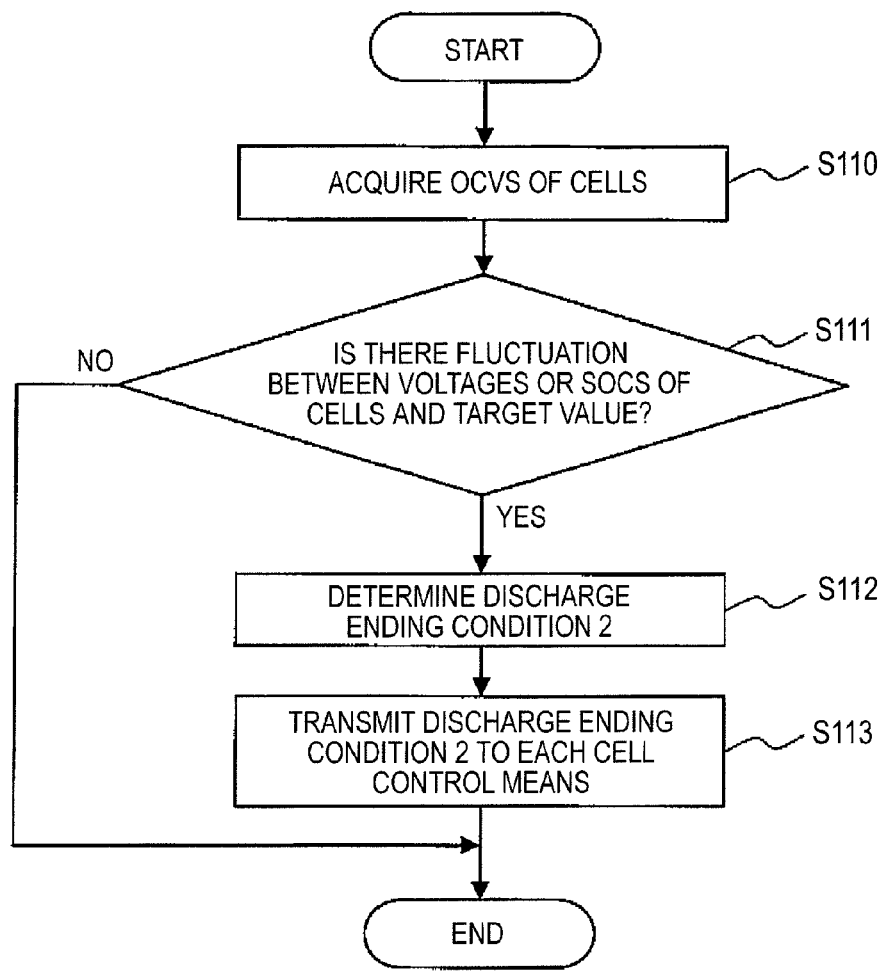
FIG. 7A is a flowchart for explaining an operation example of battery pack control means during travelling or charging of a vehicle.

Subsequently, the flow of the operation of the battery pack control means 150 determining the discharge ending condition 2 according to the present embodiment will be described with reference to the flowchart of FIG. 7A. FIG. 7A is a flowchart of the operation of the battery pack control means 150 during travelling or charging of the vehicle.

First, in Step 110, the voltage (OCV) when all cells 111 are in a no-load condition or in such a state that can be considered as a no-load condition where a weak current flows is acquired. Subsequently, the flow proceeds to Step 111, and it is determined whether there is a fluctuation between the voltages or the SOCs of the cells 111 that constitute the cell group 112 and the intended voltage or SOC. When it is determined that there is a fluctuation, the flow proceeds to Step 112.

In Step 112, the discharge ending condition 2 for the discharge means 2 using the equalization circuit that includes the bypass resistor 122 and the bypass switch 123 is determined. In Step 113, the discharge ending condition 2 is transmitted to the cell control means 121.

Figure 7B:
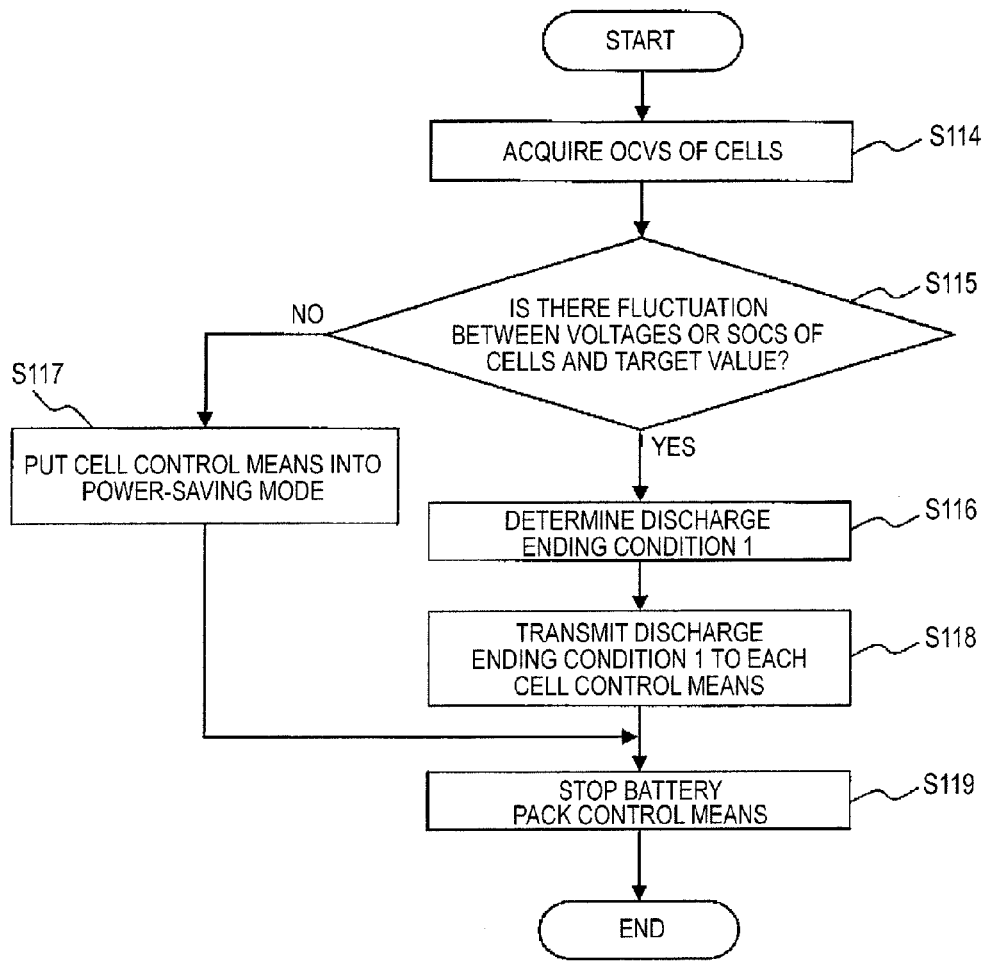
FIG. 7B is a flowchart for explaining an operation example of the battery pack control means during stopping of a vehicle.

Subsequently, the flow of the operation of the battery pack control means 150 determining the discharge ending condition 1 according to the present embodiment will be described with reference to the flowchart of FIG. 7B. FIG. 7B is a flowchart of the operation of the battery pack control means 150 during stopping of the vehicle.

In Step 114, the OCVs of all cells 111 are acquired, and the flow proceeds to Step 115. In Step 115, it is determined whether there is a fluctuation in the smallest voltage or SOC of the cells 111 that constitute the cell group 112. When there is not a fluctuation in the voltage or SOC, the flow proceeds to Step 117, and the cell control means 121 proceeds to the power-saving mode. Moreover, the battery pack control means 150 proceeds to the power-saving mode in Step 119. When it is determined in Step 115 that there is a fluctuation in the voltage or SOC of the cells 111, the flow proceeds to Step 116.

In Step 116, the discharge ending condition 1 is determined. In Step 118, the discharge ending condition 1 is transmitted to the cell control means 121. After that, in Step 119, the battery pack control means 150 proceeds to the power-saving mode. Here, the power-saving mode of the battery pack control means 150 is an operation mode in which consumption current is smaller than that of a normal mode in which the vehicle is activated. For example, the power-saving mode is an operation mode in which a function of computing the SOC, a function of computing the discharge ending condition described above, and the like of the functions of the battery pack control means 150 are stopped, and a function for receiving a normal mode transition command transmitted from the vehicle control means 200 is allowed to operate during the next activation of the vehicle so that the energy supplied from the in-vehicle auxiliary battery is decreased as compared to the normal mode.

Figure 8A:
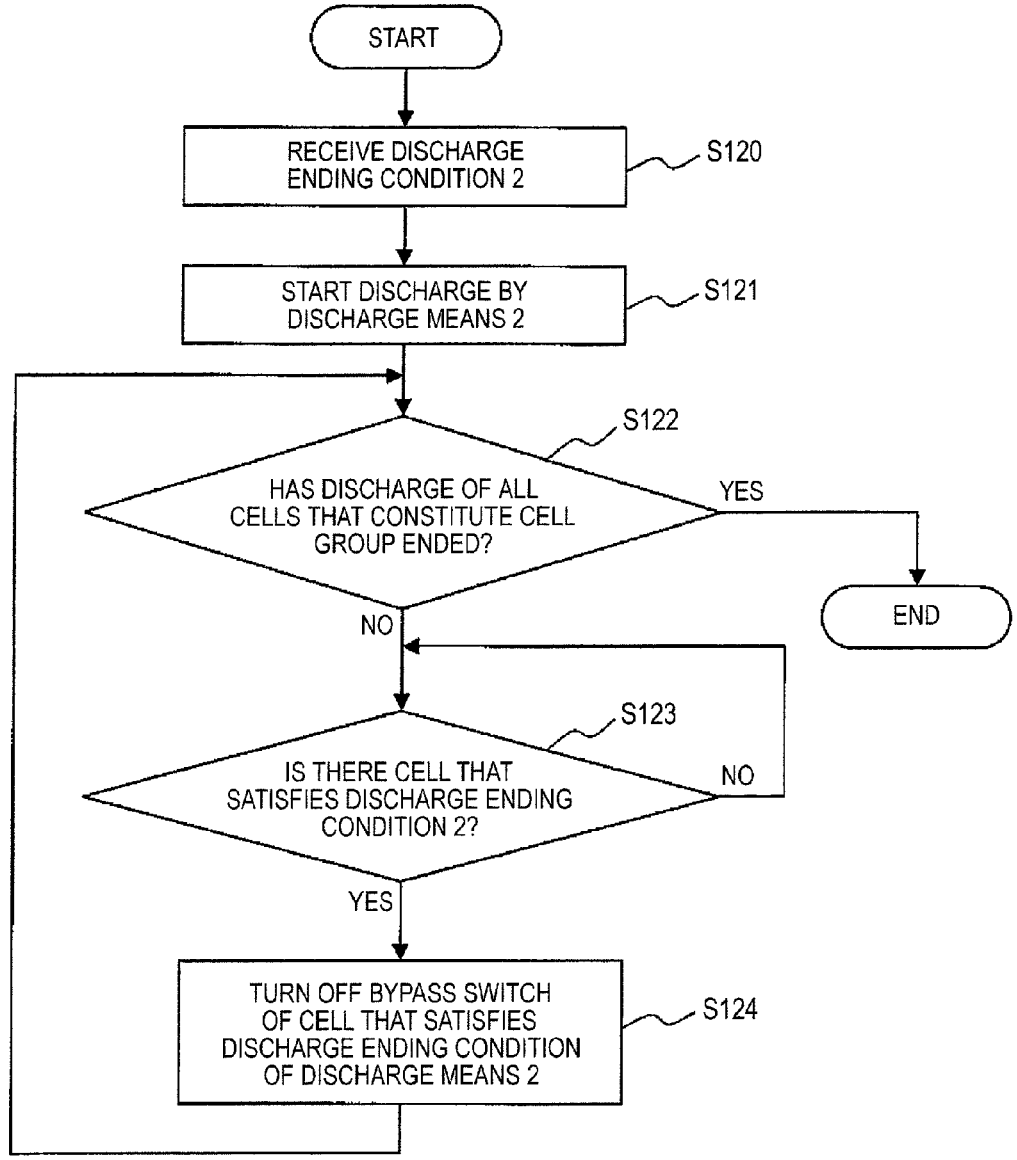
FIG. 8A is a flowchart for explaining an operation example of the cell control means during travelling or charging of a vehicle.

Subsequently, the flow of the operation of the discharge means 2 of the cell control means 121 according to the present embodiment will be described with reference to the flowchart of FIG. 8A. FIG. 8A is a flowchart for explaining the operation of the cell control means 121 during travelling or charging of the vehicle.

First, in Step 120, the cell control means 121 receives the discharge ending condition 2 transmitted from the battery pack control means 150. Subsequently, the flow proceeds to Step 121, the discharge from the discharge target cell 111 is started using the equalization circuit that includes the bypass resistor 122 and the bypass switch 123.

In Step 122, it is determined whether the discharge of all cells that constitute the cell group 112 has ended. When it is determined that the discharge has ended, the cell control means 121 ends the process. When it is determined in Step 122 that the discharge of all cells 111 has not ended, the flow proceeds to Step 123 and it is determined whether there is a cell 111 that satisfies the discharge ending condition 2. When there is a cell 111 in which the discharge has ended, the flow proceeds to Step 124, and the bypass switches 123 are turned off sequentially starting with the cell 111 in which the discharge has ended. After that, the flow returns to Step 122, and the process is continued until the discharge of all cells 111 that constitute the cell group 112 ends.

Figure 8B:
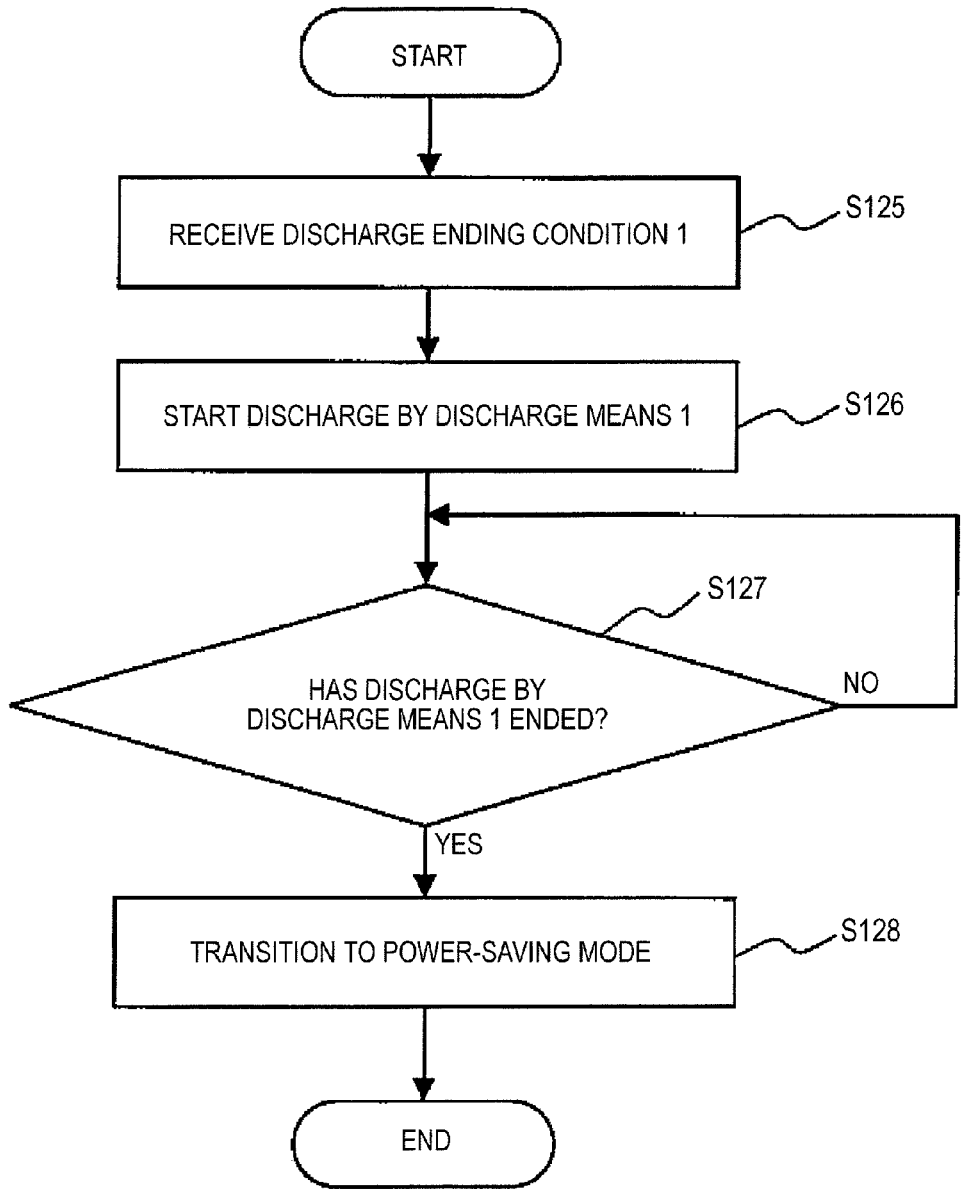
FIG. 8B is a flowchart for explaining an operation example of cell control means during stopping of a vehicle.

Subsequently, the flow of the operation by the discharge means 1 of the cell control means 121 according to the present embodiment will be described with reference to the flowchart of FIG. 8B. FIG. 8B is a flowchart for explaining the operation of the cell control means 121 during stopping of the vehicle.

First, in Step 125, the cell control means 121 receives the discharge ending condition 1 transmitted from the battery pack control means 150. Subsequently, the flow proceeds to Step 126, and the discharge of the cell 111 by the discharge means 1 starts.

In Step 127, it is determined whether the discharge of the cells 111 that constitute the cell group 112 has ended. When it is determined that the discharge has ended, the cell control means 121 transitions to the power-saving mode.

In this way, during travelling or charging of the vehicle, equalization of the voltages or SOCs of the cells 111 that constitute the cell group 121 is performed by the discharge by the discharge means 2 using the voltage equalization circuit that includes the bypass resistor 122 and the bypass switch 123. During stopping of the vehicle, the cell control means 121 is maintained in the normal operation mode by the discharge means 1 to thereby perform voltage equalization between the cell groups using the consumption current. During stopping of the battery device 100, equalization by the discharge means 2 may be performed simultaneously with the equalization by the discharge means 1.

Figure 9:
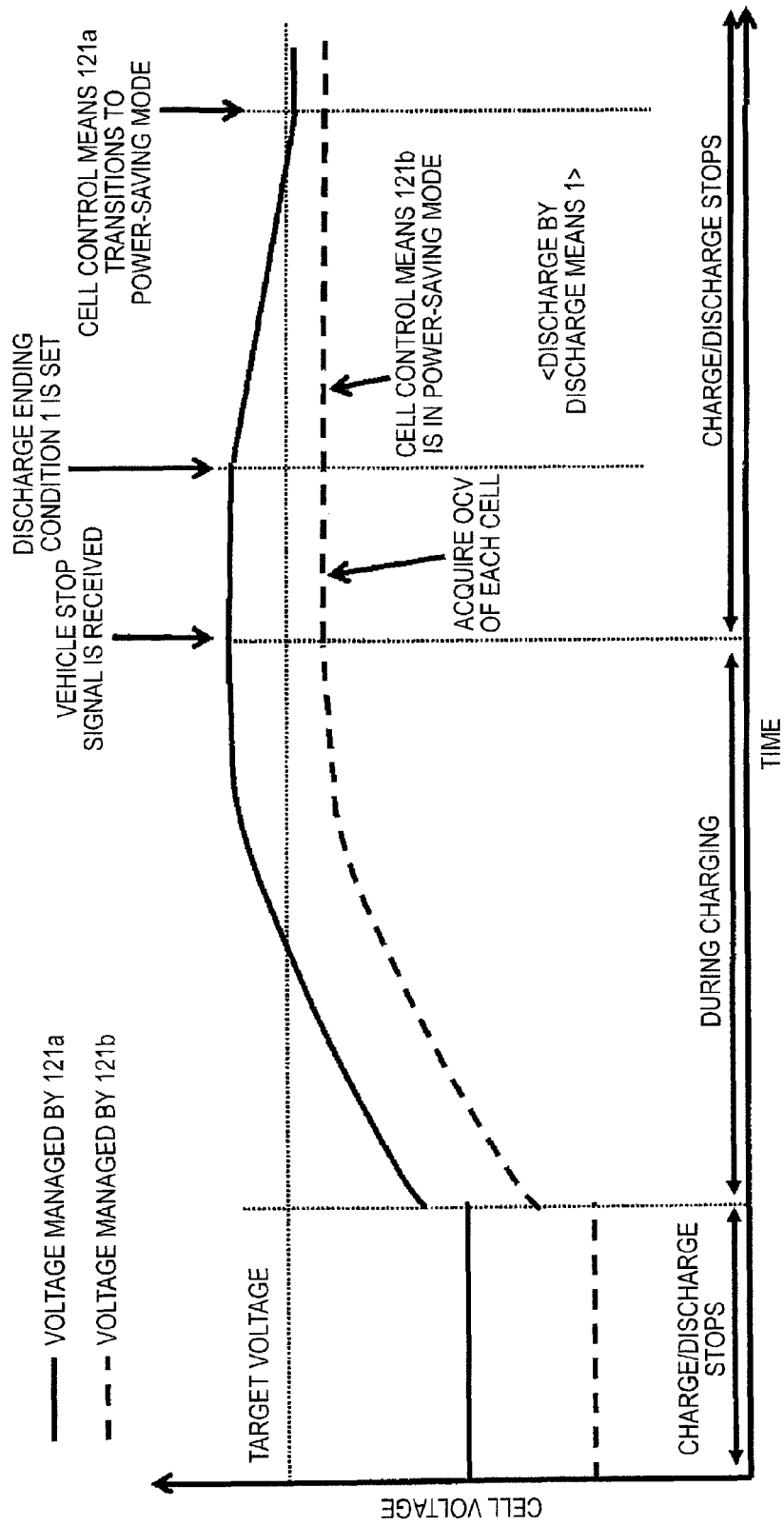
FIG. 9 is a timing chart for explaining the effects of the present invention.

FIG. 9 illustrates an operation example of the charging by the motor generator 410 or the charger 420 when a voltage fluctuation occurs between the cell groups 112 which are the units for the management by the cell control means 121. In this example, it is assumed that there is not a fluctuation between the cells 111 that constitute the cell group 112. In the illustrated example, the voltage of only the cell group 112a managed by the cell control means 121a exceeds a target voltage, and the voltage of the cell group 112b managed by the cell control means 121b does not exceed the target voltage.

The battery pack control means 150 compares the voltage of the cell group 121 with the target voltage for each cell control means and determines a cell group 121 having a cell 111 of which the voltage is higher than the target voltage as a discharge target cell group. In the case of FIG. 9, since the voltage of the cell group 112b managed by the cell control means 121b is already lower than the target voltage, a value "0" is set to the operation mode management circuit 127 of the cell control means 121b, or a power-saving mode transition command is transmitted to the cell control means 121b.

On the other hand, since the voltage of the cell group 112a managed by the cell control means 121a exceeds the target voltage, only the cell control means 121a continues the operation in the normal mode and discharges the cell group 112a. As a result, even after the operation of the battery pack control means 150 stops, the cell control means 121a can perform management of the cells 111 so that the cell voltage of the cell group 112a does not exceed the target voltage continuously.

In the present embodiment, it is also possible to eliminate a voltage or SOC fluctuation of the cells 111 that constitute the battery pack 110 to perform voltage equalization. In this case, the smallest voltage value of the cells 111 that constitute the battery pack 110 or the period required for securing a predetermined discharge amount may be set as the target value of the discharge by the discharge means 1. Moreover, as for the target value for the discharge by the discharge means 2, focusing on the cell 111 having the smallest voltage or SOC among the cells 111 that constitute the cell group 112, the smallest voltage value of the cells 111 that constitute the cell group 112 or the period required for securing a predetermined discharge amount from the discharge target cell 111 may be set.

Figure 10:
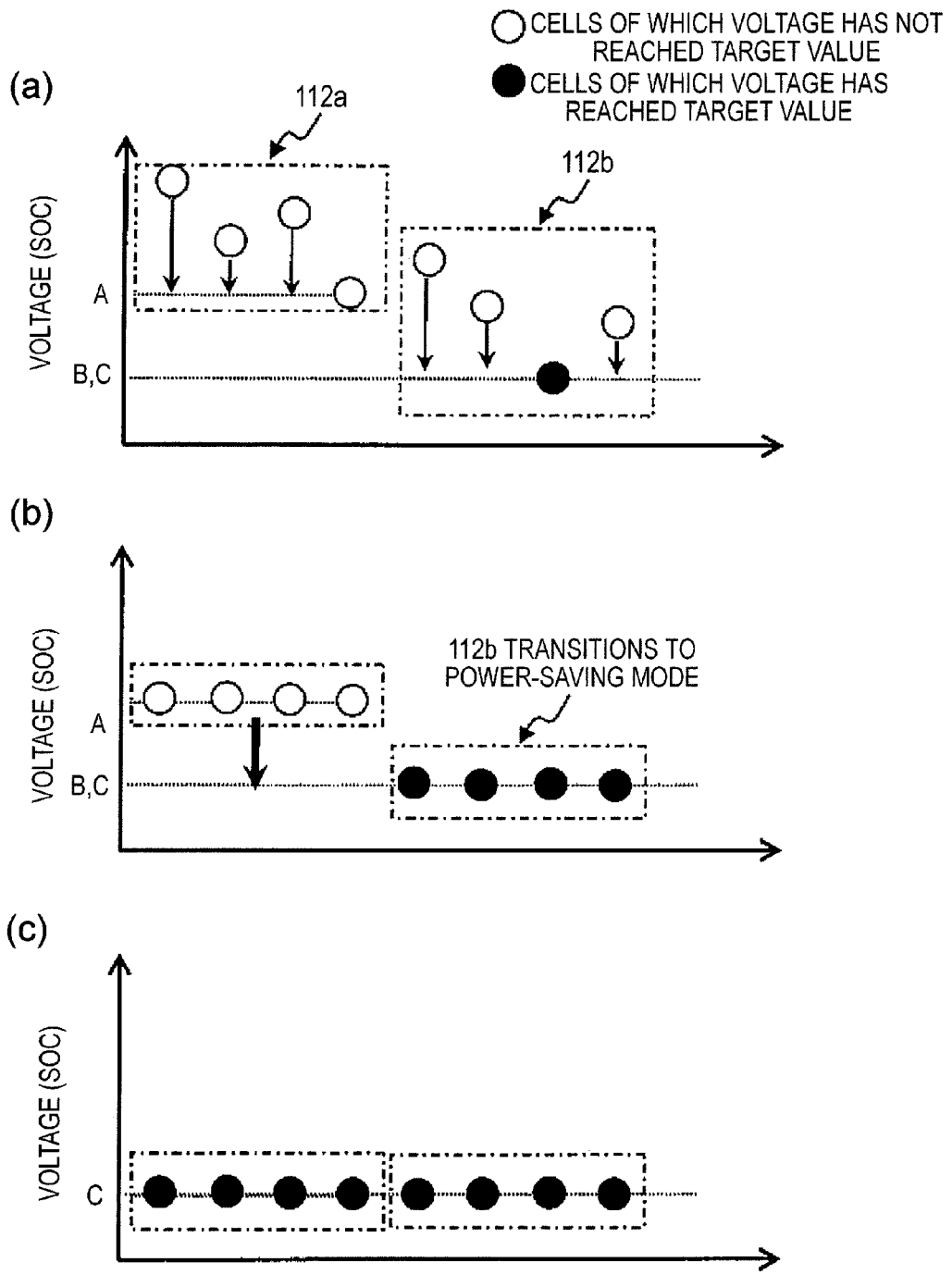
FIG. 10 is a diagram for explaining the effects of the present invention.
Figure 11:
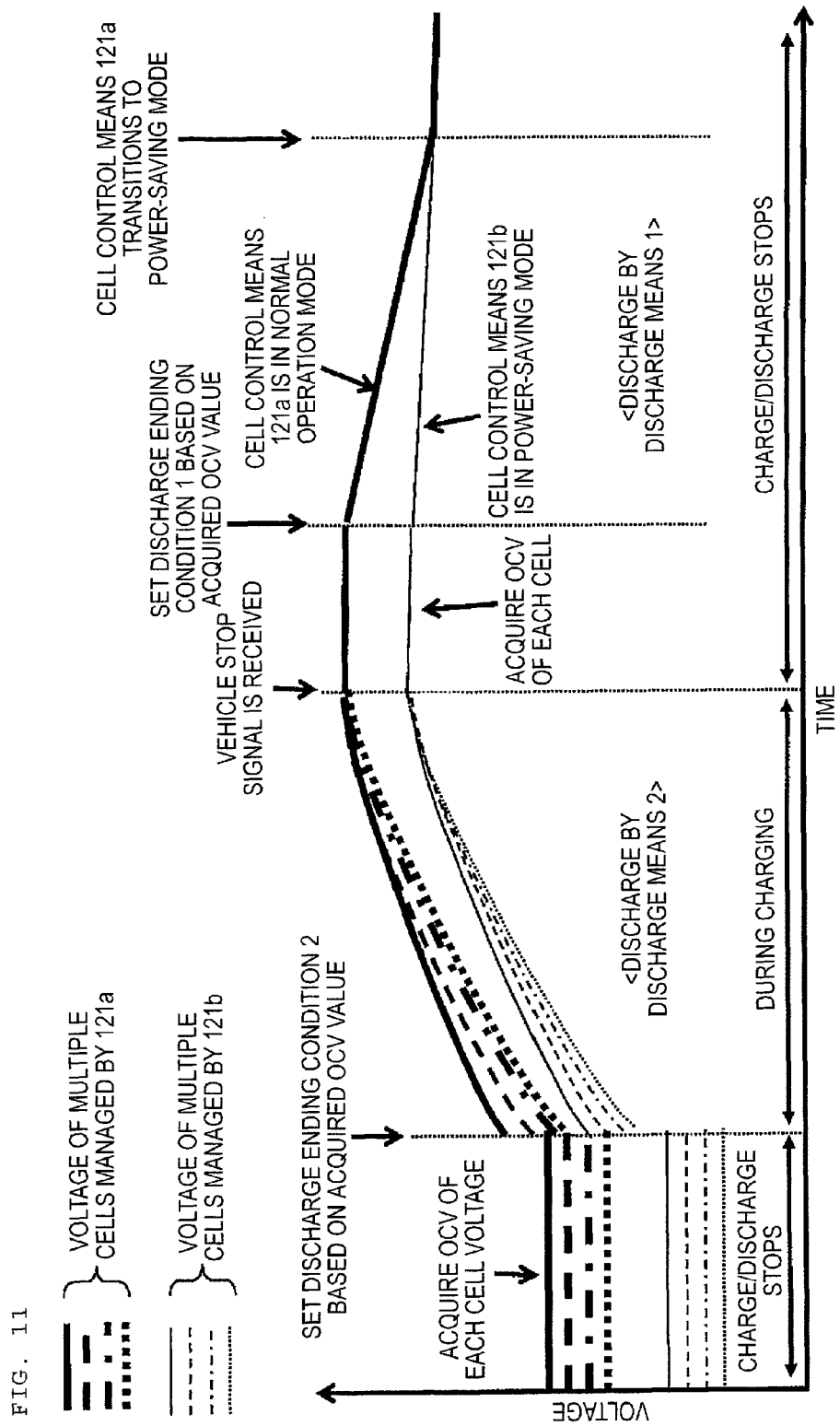
FIG. 11 is a timing chart for explaining the effects of the present invention.

FIGS. 10 and 11 illustrate a state of voltage equalization when a voltage fluctuation occurs in the four cells 111 that constitute the cell group 112a or 112b and a voltage fluctuation also occurs between the cell groups 112a and 112b. In such a case, it is possible to eliminate the voltage fluctuation by performing voltage equalization according to both the discharge means 1 and the discharge means 2. Hereinafter, a method of eliminating the voltage fluctuation will be described.

FIG. 10(a) is an explanatory view of adjustment based on a bypass current, performed during travelling or charging of the vehicle, FIG. 10(b) is an explanatory view of adjustment based on a consumption current during stopping of the vehicle, and FIG. 10(c) is a view illustrating the state after adjustment. First, since a voltage or SOC fluctuation as illustrated in FIG. 10(a) occurs in the cells 111 that constitute the cell groups 112a and 112b, the voltage or SOC fluctuation is eliminated by the discharge means 2. Here, a value "A" is set to the target value of the cell group 121a for the voltage or SOC, a value "B" is set to the target value of the cell group 121b, and a value "C" is set to the target value after the end of the discharge. The target value C is set to the same as the smaller one (in this case, the target value B) of the target values A and B.

The bypass switches 123 connected in parallel to the cells 111 are turned off sequentially starting with the cell ill in which the equalization has ended, and the discharge by the discharge means 2 stops when the voltages or SOCs of all cells 111 that constitute the cell groups 112a and 112b are equalized eventually. FIG. 10(b) illustrates the state after the fluctuation within each cell group is eliminated. In FIG. 10(b), since the voltage or SOC fluctuation of the cells 111 that constitute the cell groups 112a and 112b is eliminated, it is sufficient to eliminate the SOC or voltage fluctuation that occurs between the cell groups 112a and 112b. This SOC or voltage fluctuation is eliminated by discharging the cell group 112a by the discharge means 1. When the discharge ending condition 1 is satisfied, the cell control means 121a transitions to the power-saving mode. By doing so, after the voltage adjustment of the cells 111 has ended, it is possible to eliminate the SOC or voltage fluctuation of all cells 111 as illustrated in FIG. 10(c).

FIG. 11 illustrates the operation example of the charging by the motor generator 410 or the charger 420 when a voltage fluctuation occurs in the four cells 111 that constitute the cell group 112a or 112b and a voltage fluctuation also occurs between the cell groups 112a and 112b similarly to FIG. 10. The discharge ending condition 2 is set based on the OCV measurement result of the cells 111 measured before the charge control by the motor generator 410 or the charger 420 is performed. During the charge control, the discharge using the bypass resistor 122 or the bypass switch 123 is performed to thereby equalize the voltages of the cells 111 within the management unit of the cell control means 121. After the vehicle stop signal is received, and the charge control ends, the OCV of each cell is measured again, and the battery pack control means 150 determines the discharge ending condition 1 based on the measurement result. After the battery pack control means 150 transmits the discharge ending condition 1 to the cell control means 121, the battery pack control means 150 transitions to the power-saving mode.

In the case of the example of FIG. 11, the cell group 112a monitored by the cell control means 121a is determined as the discharge target cell group 121, and only the cell control means 121a continues the operation in the normal mode, and the cell group 112a is discharged. As a result, after the operation of the battery pack control means 150 stops, when the cell control means 112a performs the discharge, the voltage of the cell group 112a becomes the same as the voltage of the cell group 112b, and the cell control means 121a can perform voltage equalization accurately even after the voltage equalization ends and the vehicle stops.

Figure 12:
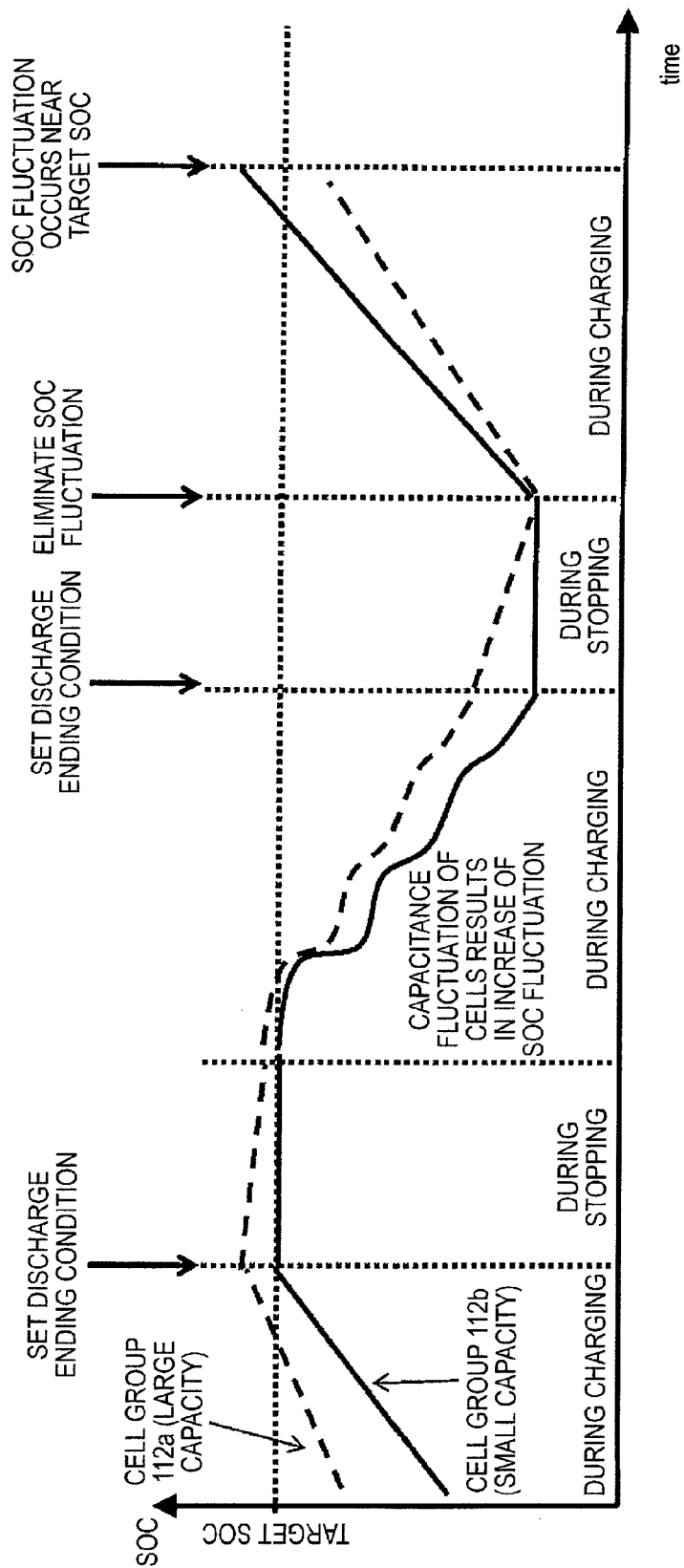
FIG. 12 is a timing chart illustrating the influence on elimination of SOC fluctuation by a difference of full-charge capacity when a PHEV and EV are used.

When performing control of the battery pack 110, it is preferable that the SOC equalization of the cells 111 is performed near the intended SOC. For example, although charging is performed up to the high SOC state in PHEV or EV, the deterioration state of the cells 111 is accelerated under such a situation. Thus, when the SOC fluctuates under the high SOC state, a fluctuation may also occur in the deterioration state. Thus, in the case of PHEV or EV, it is preferable that the SOCs are equalized in a high SOC region. FIG. 12 illustrates the state of a change of SOC of PHEV or EV as an example. FIG. 12 illustrates a state where the battery pack 110 performs charging and discharge when the cell group 112a is made up of cells 111 having a large full-charge capacity and the cell group 112b is made up of cells 111 having a small full-charge capacity. Although the SOC equalization is once executed in the high SOC region, and the fluctuation is decreased, when discharge is performed, a fluctuation occurs in the SOCs due to the difference of the full-charge capacity. If charging is performed after the SOC equalization is performed by the discharge means 1 after the discharge ends in order to eliminate the SOC fluctuation, an SOC fluctuation may occur in the high SOC region due to the difference of the full-charge capacity.

Figure 13:
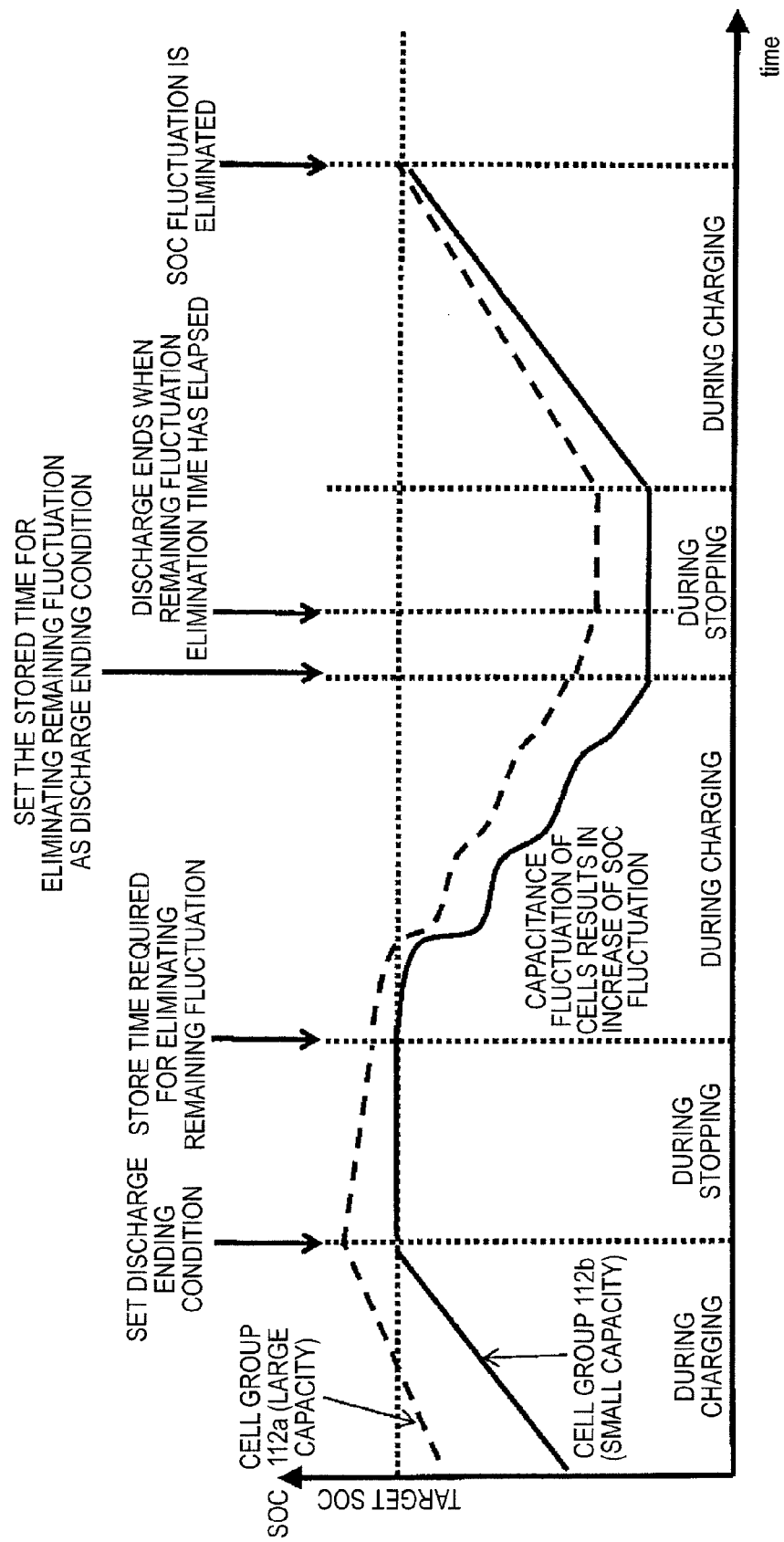
FIG. 13 is a diagram for explaining a method of eliminating SOC fluctuation in a high SOC range when PHEV and EV are used.

Therefore, in order to prevent an SOC fluctuation in the high SOC region, the battery pack control means 150 may store a discharge period (referred to as a discharge period 1) of the discharge target cell group 112a, calculated from the target SOC illustrated in FIG. 13 and the SOC fluctuation of the cell group 112 of which the SOC is higher than the target SOC on a recording medium such as an EEPROM and may perform voltage equalization based on only the discharge period 1. Moreover, the battery pack control means 150 transmits the discharge period 1 to the cell control means 121a and transitions to the power-saving mode. The cell control means 121a that monitors the discharge target cell group 112a measures a period (referred to as a discharge period 2) in which the cell group 112a monitored by the cell control means 121a performs discharge during stopping of the vehicle. When the vehicle starts operating in a state where the discharge of the discharge target cell group 112a has not ended, the cell control means 121a transmits the discharge period 2 to the battery pack control means 150, and the battery pack control means 150 calculates and stores a remaining discharge period required for securing a remaining discharge amount by subtracting the discharge period 2 from the discharge period 1. Moreover, when the subsequent equalization is performed, the discharge target cell group 112a is discharged for the stored remaining discharge period. By doing so, as illustrated in FIG. 13, it is possible to equalize the SOCs in the high SOC range.

Figure 14:
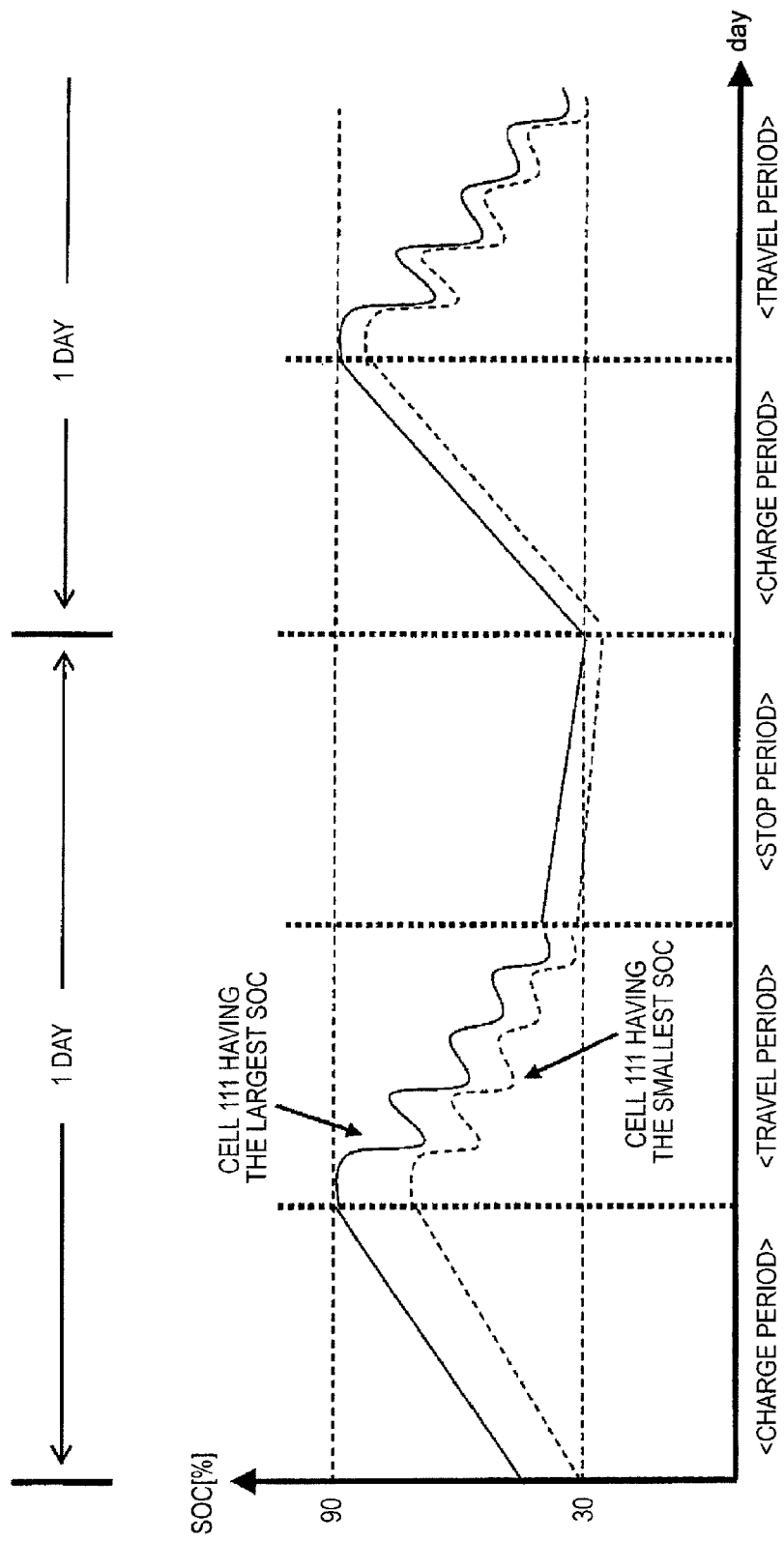
FIG. 14 is an explanatory diagram of a simulation for estimating the number of days required for SOC equalization.

The number of days required for the SOC equalization when the present invention is applied was estimated through a simulation. The simulation method will be described with reference to FIG. 14. In the simulation, it is assumed that, as illustrated in FIGS. 1 and 2, eight cells 111 are grouped into two cell groups 112a and 112b, and the cell control means 121a and 121b are allocated to the cell groups 112a and 112b. FIG. 14 illustrates a daily travel pattern example of PHEV or EV. First, any one of the eight cells 111 is charged to reach a predetermined SOC (upper-limit SOC) using a household power supply or the like. After the charging, any one of the eight cells 111 is operated (discharged) to reach a predetermined SOC (lower-limit SOC), the vehicle enters into a stop period after the travel ends. In this simulation, the travel period of the vehicle is 2 hours per day, and the remaining 22 hours are the stop period. This is the cycle of one day, and the same cycle is repeated everyday.

It is assumed that the capacity of the cell 111 is 20 Ah, the current flowing in the bypass resistor 122 is 20 mA, and the consumption current required for the operation of the cell control means 121 is 3 mA. It is also assumed that the SOCs of all cells 111 fluctuate, four cells 111 having a high SOC among the eight cells 111 constitute the cell group 112a, and the remaining four cells 111 having a small SOC constitute the cell group 112b. The SOC difference between the cell 111 having the highest SOC before the voltage equalization is performed and the cell 111 having the smallest SOC is 5%, and the number of days required for eliminating the SOC fluctuation of 5% is estimated.

FIGS. 15(a) and 15(b) illustrate the state of SOC equalization when the voltage equalization was performed only during travelling of the vehicle. Moreover, FIGS. 16(a) and 16(b) illustrate the state of SOC equalization when the cell control means that monitors the discharge target cells operates during stopping of the vehicle as well as during travelling of the vehicle to discharge the cell group to perform the voltage equalization.

FIGS. 15(a) and 16(a) illustrate the state of the SOCs of the respective cells 111 after the end of the charging of the battery pack 110. The cell 111 having the highest SOC among the cells 111 that constitute the battery pack 110 first reaches an intended upper-limit SOC for charging, and the charging ends. Thus, although the cells 111 other than the cell 111 having the highest SOC do not reach the intended SOC for charging even when the charging ends, when the voltage equalization starts, the SOC fluctuation is eliminated as the number of days increases, and the cells 111 other than the cell 111 having the highest SOC also approach the intended upper-limit SOC for charging.

FIGS. 15(b) and 16(b) illustrate the SOCs of the respective cells 111 immediately before the charging starts after the discharge of the battery pack 110 ends and the stop period has elapsed. When the discharge ends, contrary to when the charging ends, the discharge ends when the cell 111 having the smallest SOC reaches the lower-limit SOC value. Thus, although when the discharge ends, the cell 111 having the smallest SOC among the plurality of cells 111 that constitute the battery pack 110 first reaches the lower-limit SOC for discharge, and the discharge ends before the cells 111 other than the cell 111 having the smallest SOC reach the lower-limit SOC for discharge, when the voltage equalization starts, the SOC fluctuation is eliminated as the number of days increases, and the cells 111 other than the cell 111 having the smallest SOC also approach the intended lower-limit SOC for discharge.

As described above, when the voltage equalization progresses, since the SOCs of all cells 111 that constitute the battery pack 110 approach the upper-limit SOC serving as the charging target value or the discharge lower-limit SOC, it can be understood that the SOC range during the charge and discharge period is broadened.

The period required for ending the voltage equalization and described above is estimated as follows from FIGS. 15 and 16. When the voltage equalization is performed only during travelling of the vehicle (FIG. 15), the number of days required for the voltage equalization is 25 days. To the contrary, when the voltage equalization is performed during stopping of the vehicle as well as during travelling (FIG. 16), the number of days required for the voltage equalization is 14 days. Thus, the number of days required for the voltage equalization can be shortened by approximately 10 days as compared to when the voltage equalization is performed only during travelling of the vehicle.

In the present embodiment, although a method of performing only the voltage equalization by the discharge means 1 is performed during stopping of the vehicle is mainly described, the discharge by the discharge means 2 may be performed during stopping of the vehicle when the voltage or SOC fluctuation occurs in the cells that constitute the cell group during stopping of the vehicle.

According to the present embodiment, it is possible to manage the cell voltages or SOCs of the cells just by setting the power-saving mode transition condition of the cell control means 121. Thus, it is possible to realize the battery control circuit or the battery device capable of controlling the battery pack 110 with a simple process and a small number of commands.

Second Embodiment

The second embodiment of the present invention will be described with reference to FIGS. 17 and 18.

Figure 17:
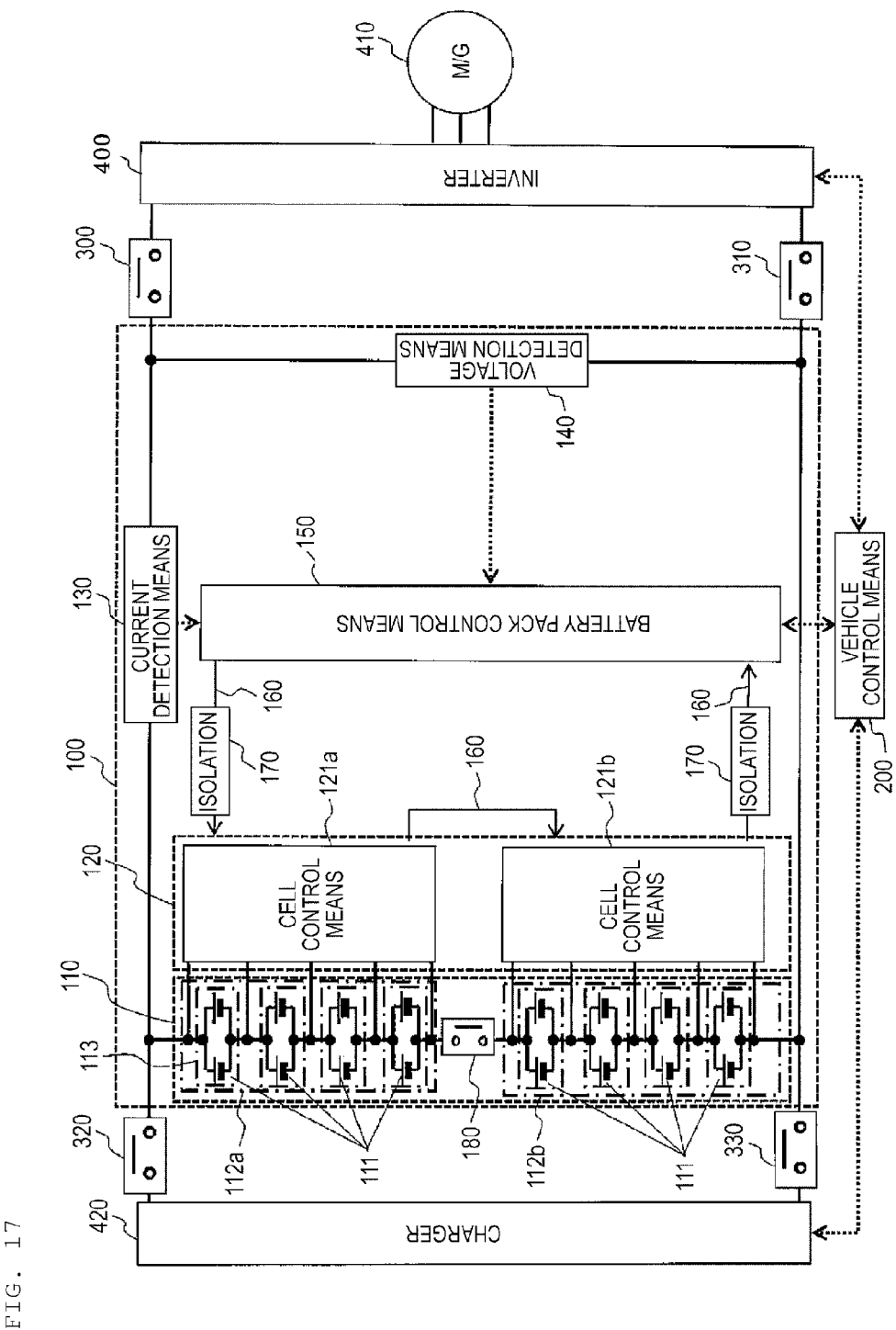
FIG. 17 is a block diagram illustrating a configuration example of a battery device of a plug-in hybrid vehicle according to the present invention.

FIG. 17 illustrates a configuration example of a battery device 100 of a plug-in hybrid vehicle according to the present embodiment. In the present embodiment, two cells 111 are electrically connected in parallel to form a parallel cell 113, and eight parallel cells 113 are electrically connected in series to form a battery pack 110. Moreover, in the present embodiment, four parallel cells 113 are connected in series to form cell groups 112a and 112b.

Cell control means 121a and 121b are allocated to the cell groups 112a and 112b that are grouped in this way. The cell control means 121a and 121b are connected in parallel to the cell groups 112a and 112b and monitor and control the state of the parallel cells 113 that constitute the cell groups 112a and 112b to which the cell control means 121a and 121b are allocated.

As described above, the present embodiment is different from the first embodiment in terms of the configuration of the battery pack 110 only, and the configurations of the current detection means 130 and the battery pack control means 150 are the same as those of the first embodiment.

Figure 18:
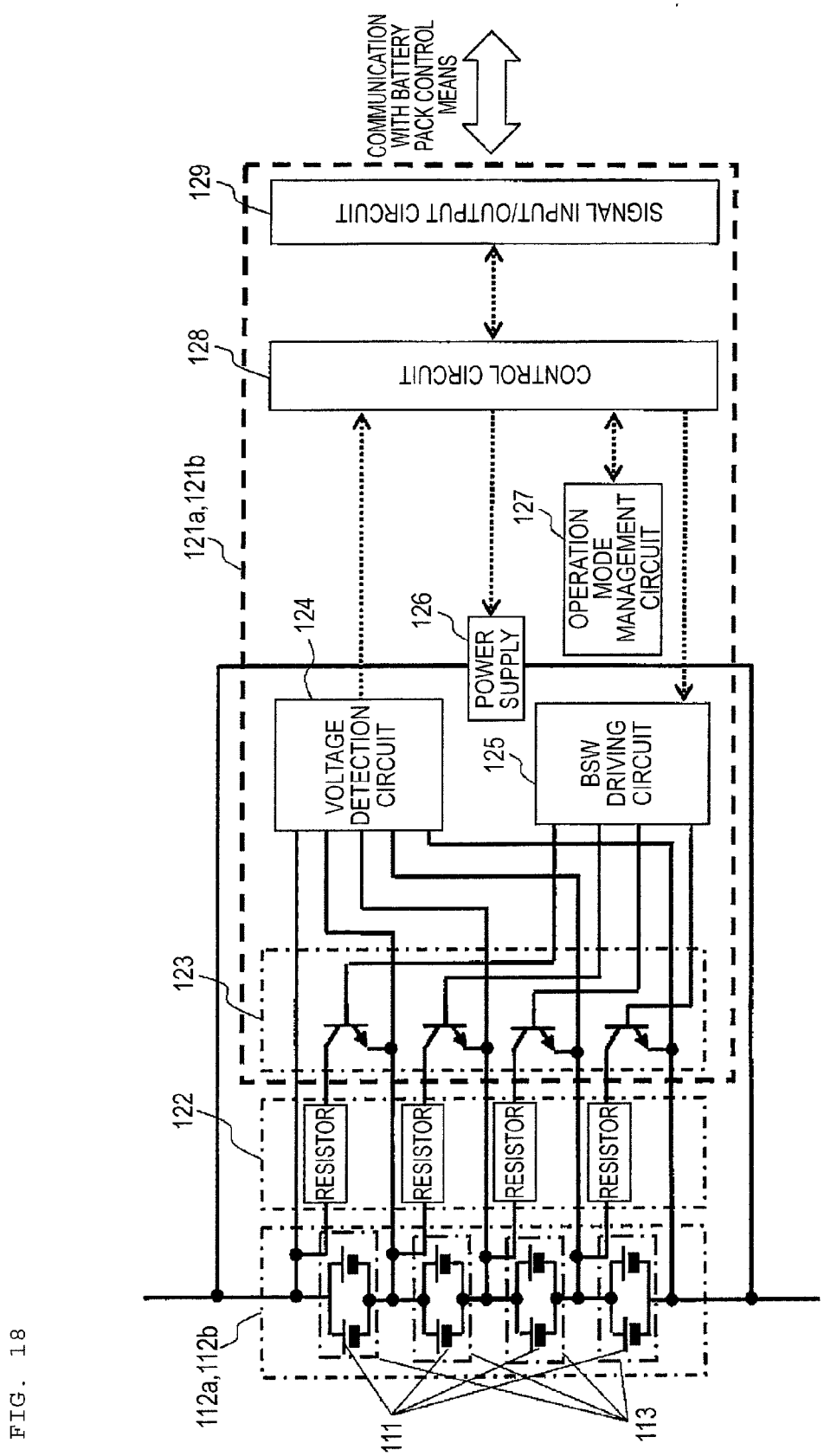
FIG. 18 is a block diagram illustrating a circuit configuration of cell control means.

FIG. 18 illustrates a circuit configuration diagram of the cell control means 121 according to the present embodiment. The present embodiment is different from the first embodiment in that the parallel cells 113 in which two cells 111 are connected in parallel are connected in series. Moreover, the equalization circuit that includes the bypass resistor 122 and the bypass switch 123 is connected in parallel to one group of the parallel cells 113, and the BSW driving circuit 125 can drive the bypass switch 123.

A method of determining the discharge ending condition according to the present embodiment will be described. In the present embodiment, since two cells 111 are connected in parallel, the second method of determining the discharge ending condition 1 and the discharge ending condition 2, that is, only the method of computing the period required for securing the predetermined discharge amount is different from that of the first embodiment. The first method of determining the discharge ending condition 1 and the discharge ending condition 2, that is the method of determining the discharge ending condition based on the cell voltage of the parallel cell 113 is the same as the method described in the first embodiment. Thus, a method of calculating the period required for securing the predetermined discharge amount according to the present embodiment will be described.

The second method of determining the discharge ending condition 1 according to the present embodiment will be described. First, the OCVs of the parallel cells 113 that constitute the battery pack are measured, and the SOC is estimated based on a correlation between SOC and OCV. Moreover, the SOC (SOCmin) of the parallel cell 113 having the smallest SOC among the parallel cells 113 that constitute the cell groups 112a and 112b is calculated according to Expression (2-1). Hereinafter, the smallest SOCs of the cells 111 that constitute the respective cell groups 112a, 112b, and the like will be referred to as $SOCmin_1, \ldots,$ and $SOCmin_M$.

In order to determine the discharge ending condition 1 based on the calculation result of Expression (2-1), a difference $\Delta SOC1$ between the SOCmin of each cell group 112 and the intended SOC (target SOC) is calculated according to Expression (2-2).

A period t1' required for adjustment is calculated from the calculated $\Delta SOC1$ according to Expression (2-3') below.

[Mathematical Formula 7]

$$\left.\begin{aligned} t1_1' &= (\Delta SOC1_1 \times Qmax_1)/I_c \times 2 \\ t1_2' &= (\Delta SOC1_2 \times Qmax_2)/I_c \times 2 \\ t1_3' &= (\Delta SOC1_3 \times Qmax_3)/I_c \times 2 \\ &\vdots \\ t1_M' &= (\Delta SOC1_M \times Qmax_M)/I_c \times 2 \end{aligned}\right\} \quad (2\text{-}3')$$

Here, Qmax represents a full-charge capacity [Ah] of the cell 111. Moreover, $I_C$ represents the consumption current [A] of the cell control means 121. The period required for securing a predetermined discharge amount needs to be calculated by multiplying the number of cells 111 connected in parallel. Thus, as in Expression (2-3'), the number (in the present embodiment, 2) of cells 111 connected in parallel is multiplied. Based on the above calculation result, the discharge target cell group 112 is discharged, and the discharge ends when the period required for securing the predetermined discharge amount has elapsed.

Similarly, the second method of determining the discharge ending condition 2 according to the present embodiment will be described.

Based on the calculation result of Expression (2-1), a difference ΔSOC2 between the SOCmin of the cell group 112 and the SOC of the parallel cell 113 is calculated according to Expression (2-4).

The period t2' required for adjustment is calculated from the calculated ΔSOC2 according to Expression (2-5') below.

[Mathematical Formula 8]

$$\left.\begin{array}{l} t2_{1X}' = 2 \times (\Delta SOC2_{1X} \times Q\max_{1X})/I_B \\ t2_{2X}' = 2 \times (\Delta SOC2_{2X} \times Q\max_{2X})/I_B \\ t2_{3X}' = 2 \times (\Delta SOC2_{3X} \times Q\max_{3X})/I_B \\ \vdots \\ t2_{MX}' = 2 \times (\Delta SOC2_{MX} \times Q\max_{MX})/I_B \\ (X = 1, 2, 3, \ldots, L) \end{array}\right\} \quad (2\text{-}5')$$

Here, $I_B$ represents a bypass current [A] flowing in the equalization circuit that is connected in parallel to the parallel cell 113. In this case, similarly to Expression (2-5'), the number (in the present embodiment, 2) of cells 111 that constitute the parallel cell 113 is also multiplied. Based on the result of Expression (2-5'), the discharge target parallel cell 113 is discharged, and the discharge ends when the period required for the discharge has elapsed.

The flow of the operation of the battery device according to the present embodiment is the same as the operation (FIG. 6) of the battery device according to the first embodiment.

The operation of the battery pack control means 150 according to the present embodiment is the same as the operation (FIGS. 7A and 7B) of the battery pack control means 150 according to the first embodiment.

The operation of the cell control means 121 according to the present embodiment is the same as the operation (FIGS. 8A and 8B) of the cell control means 121 according to the first embodiment.

According to the present embodiment, since the voltages of the two cells 111 that constitute the parallel cell 113 are the same, by discharging the discharge target parallel cell 113 by the discharge means 1 and the discharge means 2, it is possible to obtain the same effects as the first embodiment.

Third Embodiment

The third embodiment of the present invention will be described with reference to FIGS. 19 to 27. In the present embodiment, one cell control means 121 corresponds to one cell 111, and the state of one cell 111 is monitored by one cell control means 121. This is different from the first embodiment.

Figure 19:
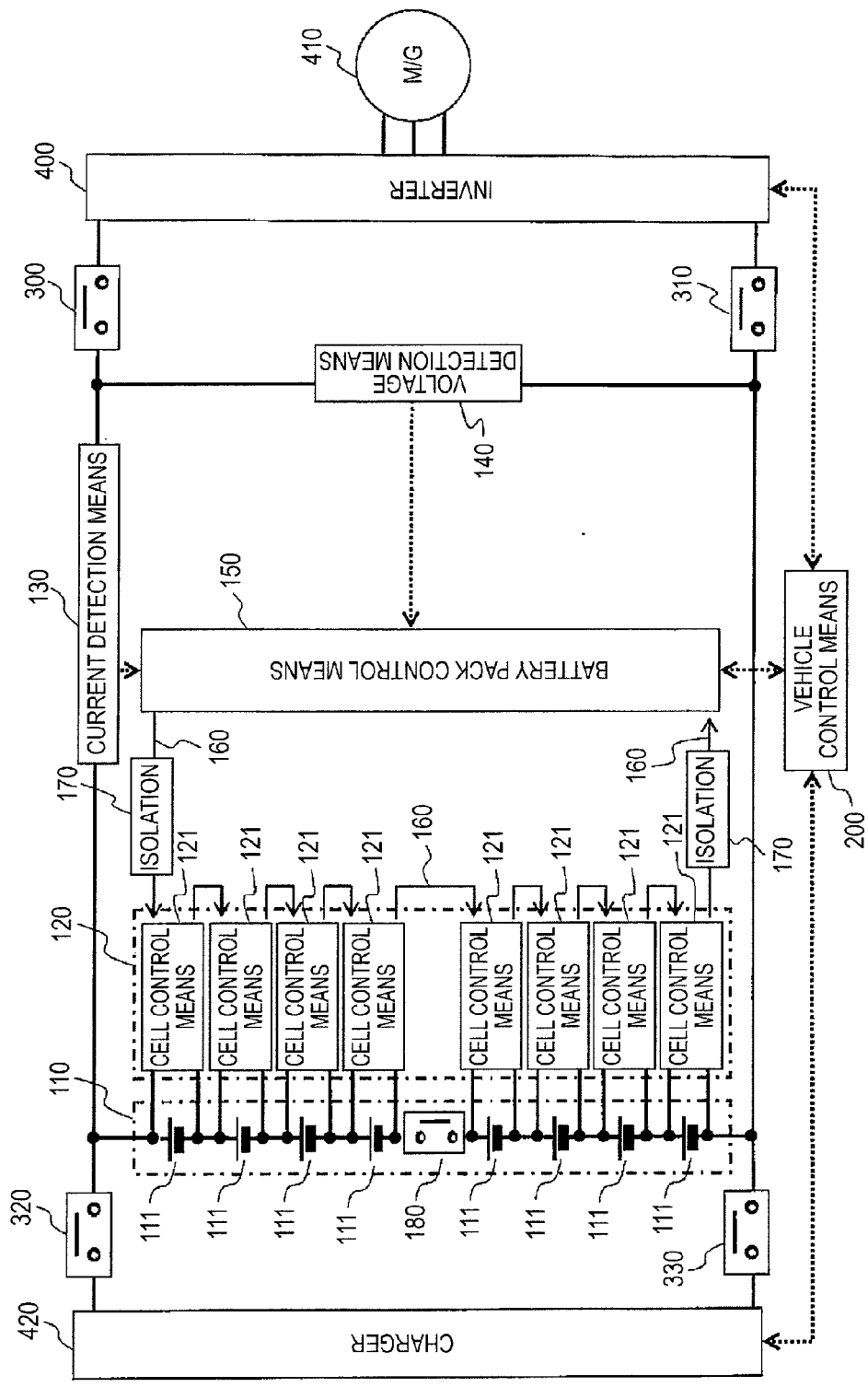
FIG. 19 is a block diagram illustrating a configuration example of a battery device of a plug-in hybrid vehicle according to the present invention.

FIG. 19 illustrates a configuration example of a battery device 100 including a driving system of a plug-in hybrid vehicle according to the present embodiment. In the present embodiment, to simplify the description, similarly to the first embodiment, eight cells 111 form a battery pack 110.

Figure 20:
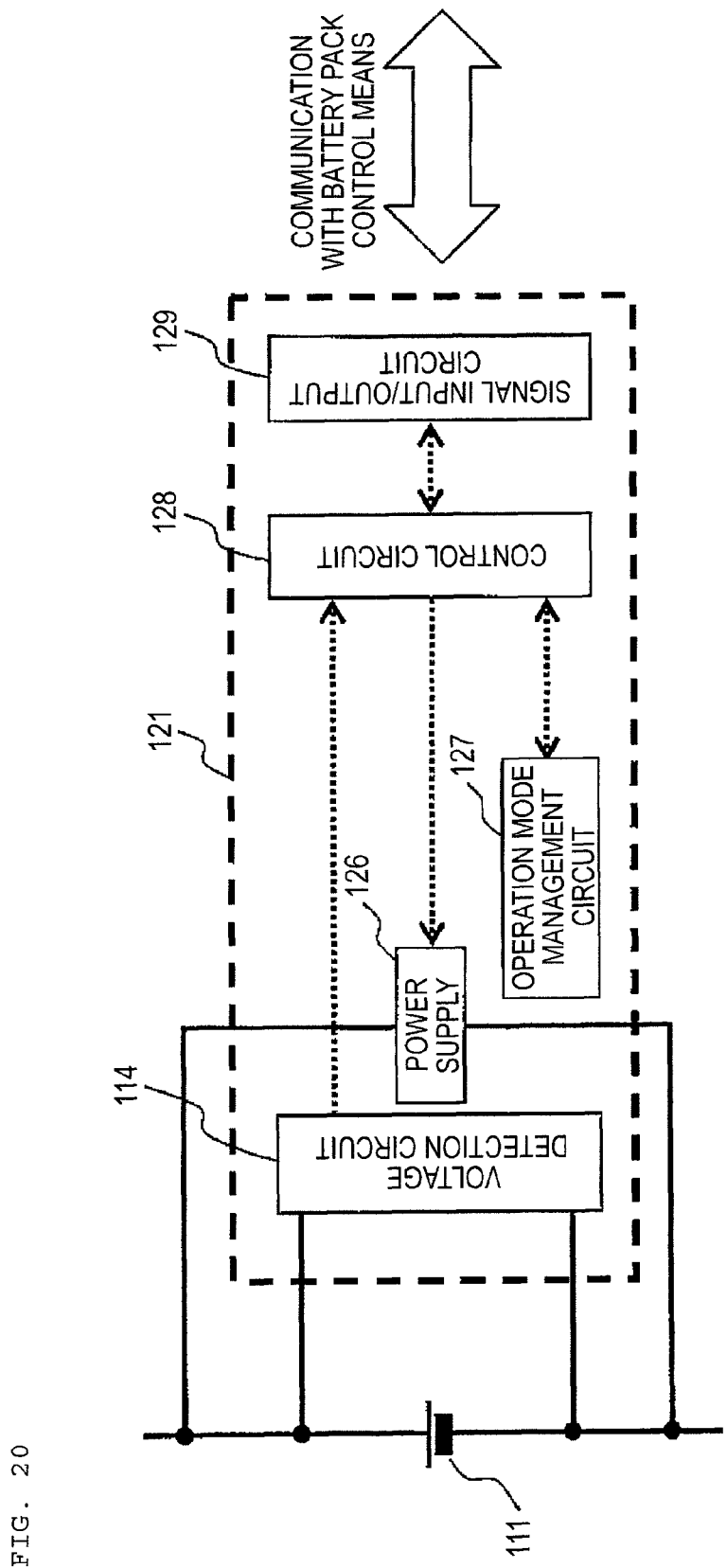
FIG. 20 is a block diagram illustrating a circuit configuration of cell control means.

Moreover, FIG. 20 illustrates a circuit configuration of the cell control means 121 according to the present embodiment. When one cell control means 121 is allocated to one cell, the voltages of cells 111 can be adjusted by only the discharge means 1 using the consumption current required for the operation of the cell control means 121. Thus, it is not necessary to use the discharge means 2 that uses the equalization circuit that includes the bypass resistor 122 and the bypass switch 123. Thus, since the bypass resistor 122, the bypass switch 123, and the BSW driving circuit 125 for driving the bypass switch 123 are not required as compared to the circuit configuration of the cell control means 121 according to the first embodiment, it is possible to simplify the circuit configuration of the cell control means 121.

A method of determining the discharge ending condition 1 according to the present embodiment will be described. In description of the computation formula applied to determine the discharge ending condition 1, the number 8 of cells 111 is substituted with N.

The first method of determining the discharge ending condition 1 according to the present embodiment will be described. The OCVs of the cells 111 that constitute the battery pack 110 are detected, and an intended OCV (target OCV) is compared with the detected OCV of the cell 111. As a result, a cell having an OCV higher than the target OCV is determined as a discharge target cell, and the target cell 111 is discharged with the consumption current in the normal mode of the cell control means 121 during stopping of the vehicle. When the voltage value of the discharge target cell 111 becomes the same as the target OCV, the discharge ends, and the cell control means 121 that monitors the cell 111 in which the discharge has ended transitions to the power-saving mode.

The second method of determining the discharge ending condition 1 according to the present embodiment will be described. In the second method of determining the discharge ending condition 1, the period required for securing a predetermined discharge amount is calculated, and the target cell 111 is discharged with the consumption current in the normal mode of the cell control means 121 during stopping of the vehicle. Moreover, when the calculated period has elapsed, the discharge ends, and the cell control means that monitors the cell in which the discharge has ended transitions to the power-saving mode. Thus, in this method, time measuring means such as a timer for measuring the calculated period is provided in the cell control means 121.

First, the SOC is estimated based on a correlation between SOC and OCV from the OCV measurement result of the cells 111 that constitute the battery pack 110, and a difference ΔSOC3 between the SOC and an intended SOC (target SOC) of each cell 111 is calculated according to Expression (3-1) below.

[Mathematical Formula 9]

$$\left.\begin{array}{l} \Delta SOC3_1 = SOC_1 - \text{Target } SOC \\ \Delta SOC3_2 = SOC_2 - \text{Target } SOC \\ \Delta SOC3_3 = SOC_3 - \text{Target } SOC \\ \vdots \\ \Delta SOC3_N = SOC_N - \text{Target } SOC \end{array}\right\} \quad (3\text{-}1)$$

A period t3 required for adjustment is calculated from the calculated ΔSOC3 according to Expression (3-2) below.

[Mathematical Formula 10]

$$\left.\begin{array}{l} t3_1 = (\Delta SOC3_1 \times Q\max_1)/I_C \\ t3_2 = (\Delta SOC3_2 \times Q\max_2)/I_C \\ t3_3 = (\Delta SOC3_3 \times Q\max_3)/I_C \\ \vdots \\ t3_N = (\Delta SOC3_N \times Q\max_N)/I_C \end{array}\right\} \quad (3\text{-}2)$$

Here, Qmax represents a full-charge capacity [Ah] of the cell 111, and $I_C$ represents the consumption current [A] of the cell control means 121. The discharge target cell 111 is discharged based on the result of Expression (3-2) during stopping of the vehicle, and the discharge ends when the period required for securing a predetermined discharge amount has elapsed.

In the present embodiment, similarly to the first embodiment, it is also possible to eliminate a voltage fluctuation of the cells 111 that constitute the battery pack 110 to perform voltage equalization. In this case, the smallest voltage value or the smallest SOC value of the cells 111 that constitute the battery pack 110 may be set as a target value for the discharge by the discharge means 1.

Figure 21:
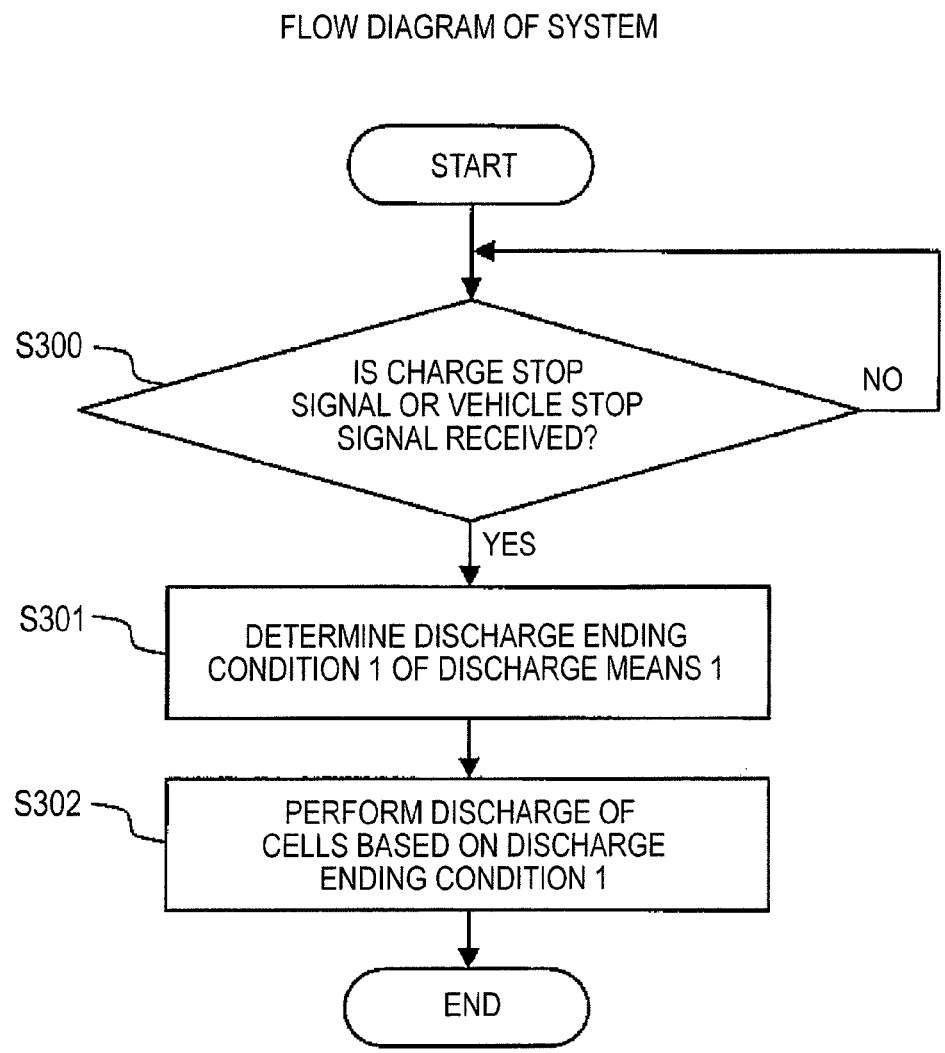
FIG. 21 is a flowchart for explaining an operation example of a battery device according to the present invention.

Subsequently, the flow of the operation of the battery device according to the present embodiment will be described with reference to the flowchart of FIG. 21.

First, in Step 300, it is determined whether the battery device has received a charge stop signal or a vehicle stop signal. When the cell groups or the vehicle stop signal is received, the flow proceeds to Step 301.

In Step 301, the battery pack control means 150 determines the discharge ending condition 1 for the voltage equalization using the consumption current of the cell control means 121 and transmits the discharge ending condition 1 to the cell control means 121. The flow of the operation of the battery pack control means 150 in Step 301 will be described later with reference to FIG. 22.

Subsequently, in Step 302, the discharge of the cell 111 monitored by the cell control means 121 is performed based on the discharge ending condition 1. The flow of the operation of the cell control means 121 in Step 302 will be described later with reference to FIG. 23.

Figure 22:
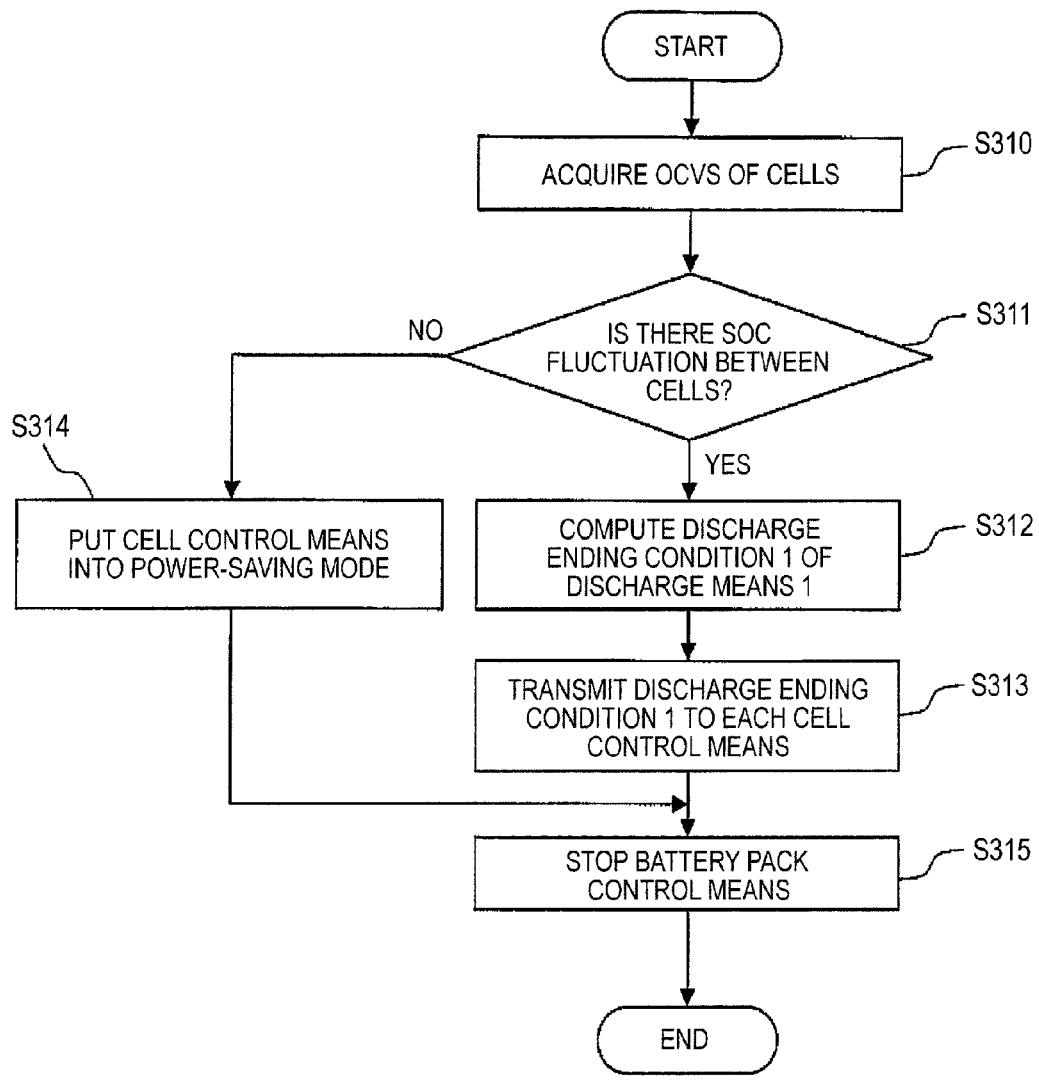
FIG. 22 is a flowchart for explaining an operation example of battery pack control means according to the present invention.

The flow of the operation of the battery pack control means 150 according to the present embodiment will be described with reference to the flowchart of FIG. 22.

First, in Step 310, the OCVs of the cells 111 that constitute the battery pack 110 are acquired. After that, the flow proceeds to Step 311, and the acquired OCV values are compared with the target OCV value to determine whether there is a voltage or SOC fluctuation. When it is determined in Step 311 that there is not a voltage or SOC fluctuation, the flow proceeds to Step 314, and the cell control means 112 proceeds to the power-saving mode.

When it is determined in Step 311 that there is a voltage or SOC fluctuation, the flow proceeds to Step 312, and the discharge ending condition 1 of the discharge means 1 that uses the consumption current of the cell control means 121 is determined. In Step 313, the discharge ending condition is transmitted to the cell control means 121. After that, in Step 315, the battery pack control means 150 proceeds to the power-saving mode.

Figure 23:
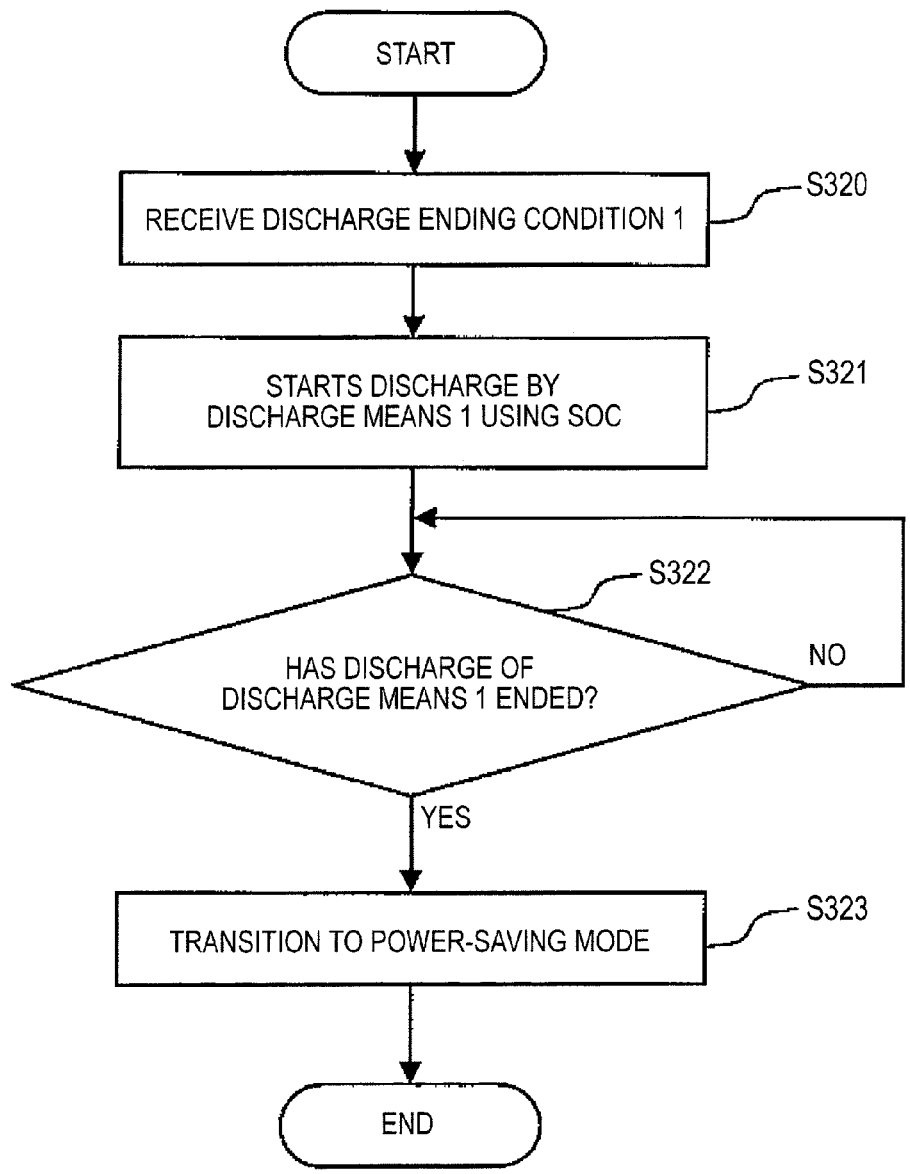
FIG. 23 is a flowchart for explaining an operation example of cell control means according to the present invention.

Subsequently, the flow of the operation of the cell control means 121 according to the present embodiment will be described with reference to the flowchart of FIG. 23.

First, in Step 320, the cell control means 121 receives the discharge ending condition 1 transmitted from the battery pack control means 150. Subsequently, the flow proceeds to Step 321, and the discharge using the consumption current of the cell control means 121 starts. In Step 322, it is determined whether the discharge of the cells 111 that constitute the battery pack 110 has ended. When it is determined that the discharge has ended, the flow proceeds to Step 323, and the cell control means 121 proceeds to the power-saving mode.

Figure 24:
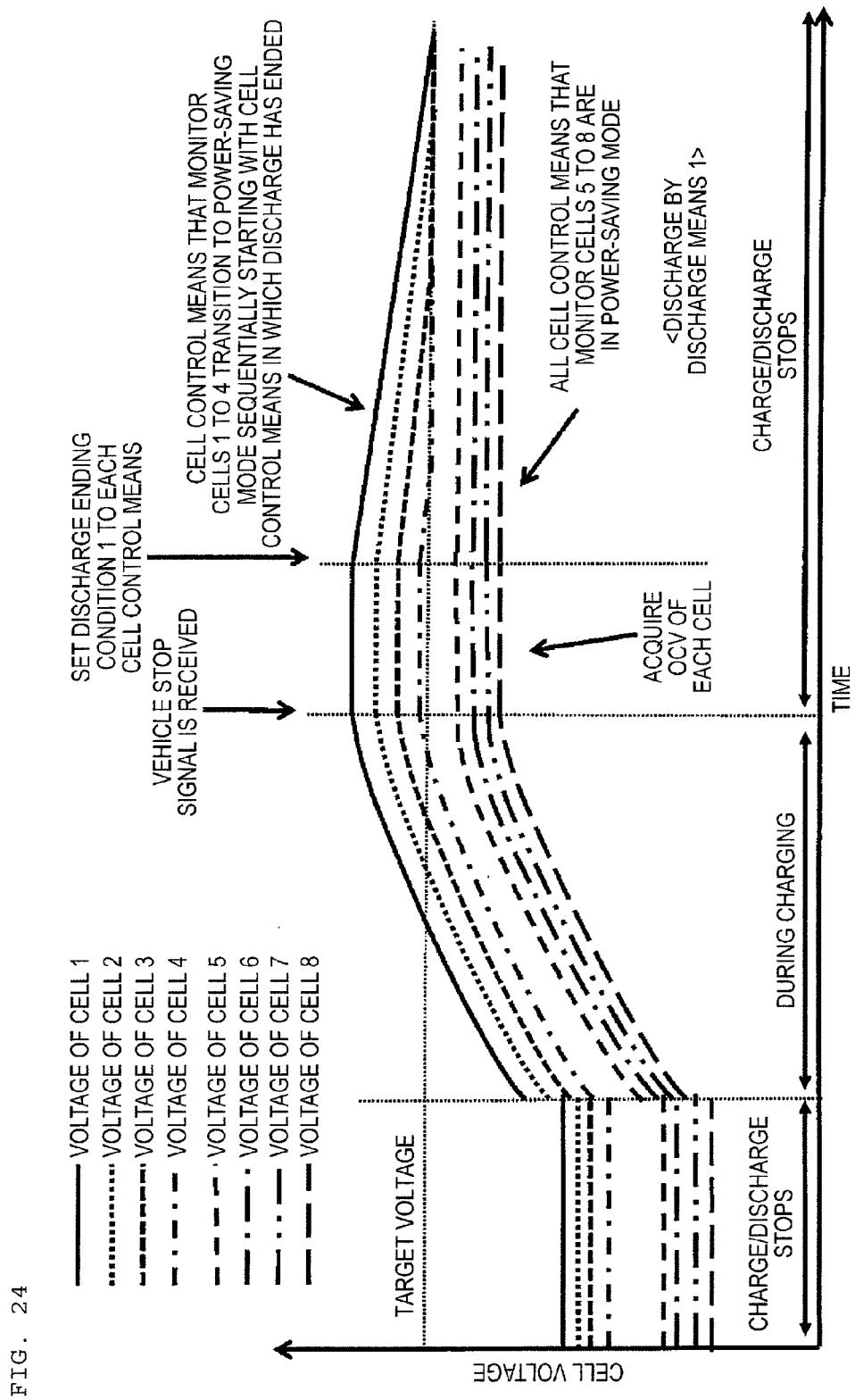
FIG. 24 is a timing chart illustrating the effects of the present invention.

FIG. 24 illustrates an operation example of the charging by the motor generator 410 or the charger 420 when a voltage fluctuation occurs between the cells 111 that are monitored by the cell control means 121.

The battery pack control means 150 compares the voltages of the cells 111 monitored by the cell control means 121 with the target voltage during stopping of charging and discharge, and a cell 111 having a voltage higher than the target voltage is determined as a discharge target cell. Here, a value "0" is set to the operation mode management circuit 127 of the cell control means 121 that monitors the cells 111 of which the voltage is already lower than the target voltage, or a power-saving mode transition command is transmitted to the cell control means 121. On the other hand, only the cell control means 121 that monitors the cells 111 having a voltage higher than the target voltage continues operating in the normal mode and discharges the discharge target cell 111. Moreover, the cell control means 121 transitions to the power-saving mode sequentially starting with the cell control means 121 that monitors the cell 111 in which the discharge has ended. As a result, even after the operation of the battery pack control means 150 has stopped, the cell control means 121 can manage the cells 111 so that the cell voltages of the cells 111 do not exceed the target voltage continuously.

Figure 25:
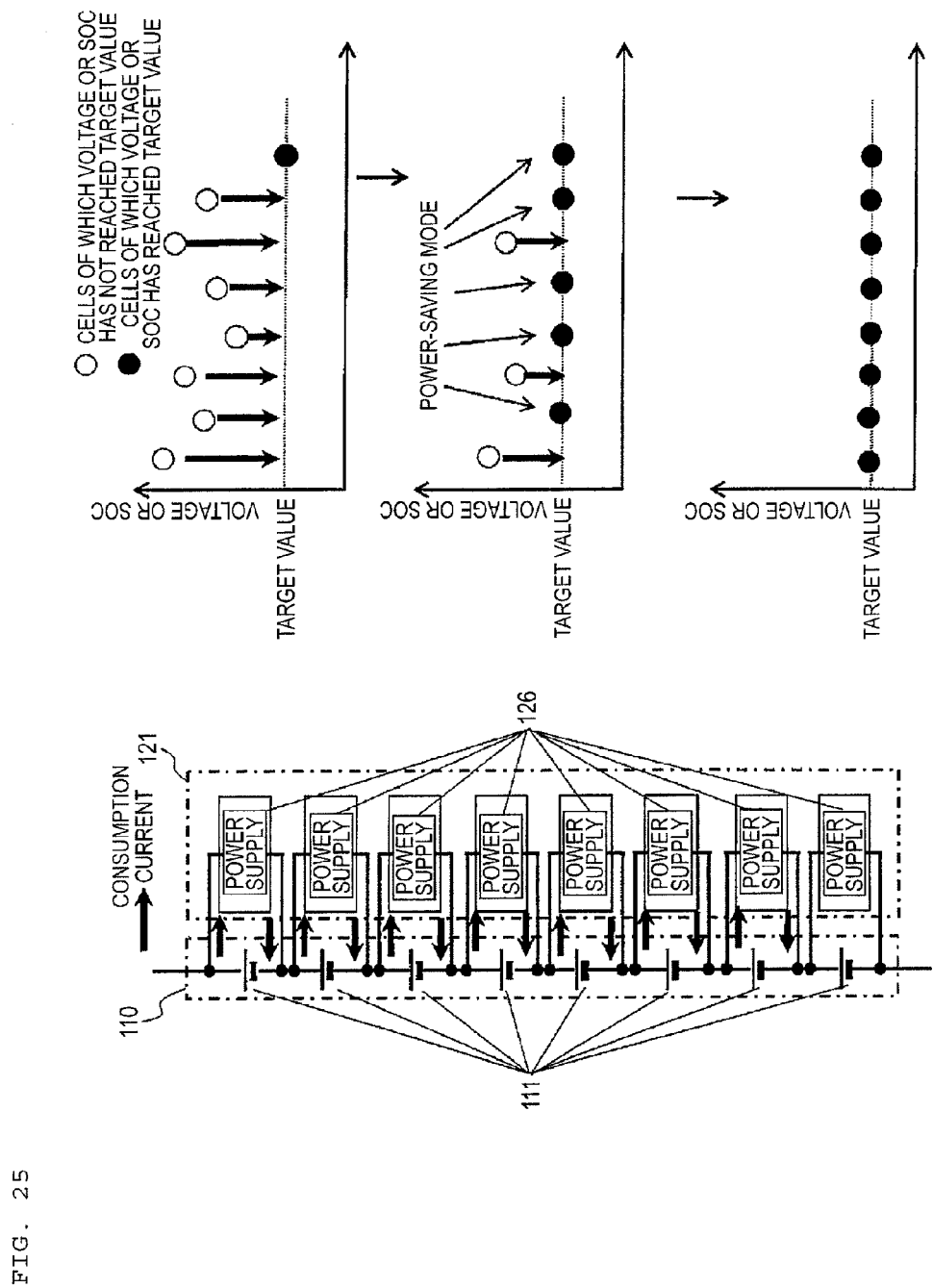
FIG. 25 is a diagram illustrating the effects of the present invention.
Figure 26:
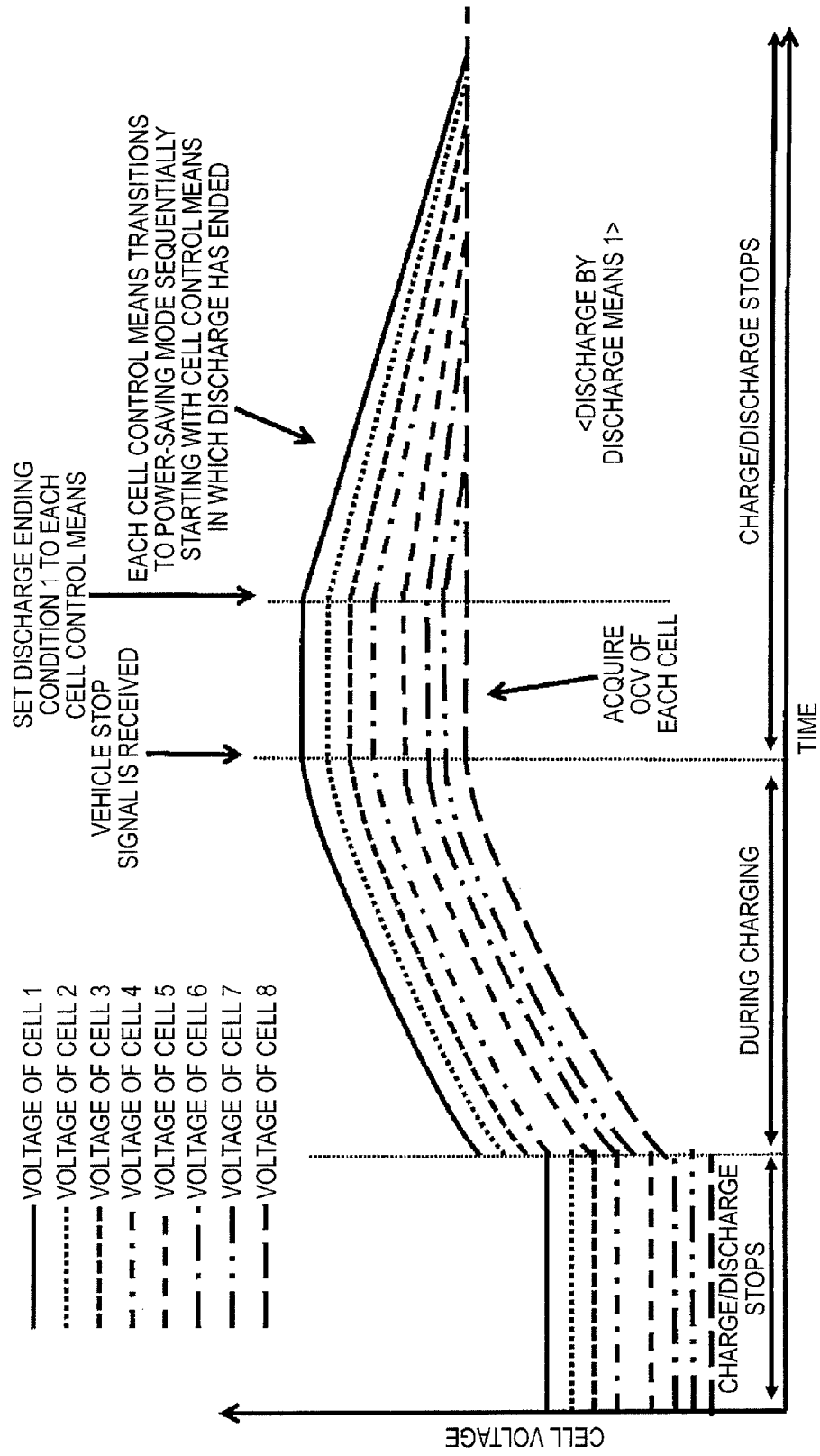
FIG. 26 is a timing chart for explaining the effects of the present invention.
Figure 27:
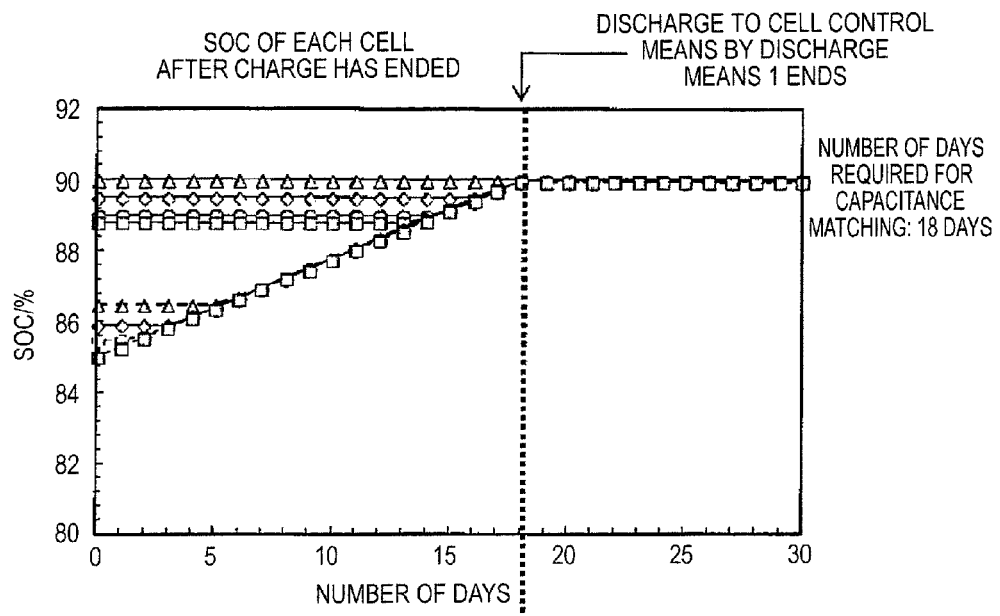
FIG. 27 is a diagram of simulation results illustrating the state of SOC equalization when voltage equalization is performed by operating cell control means during a stop period.
Figure 27:
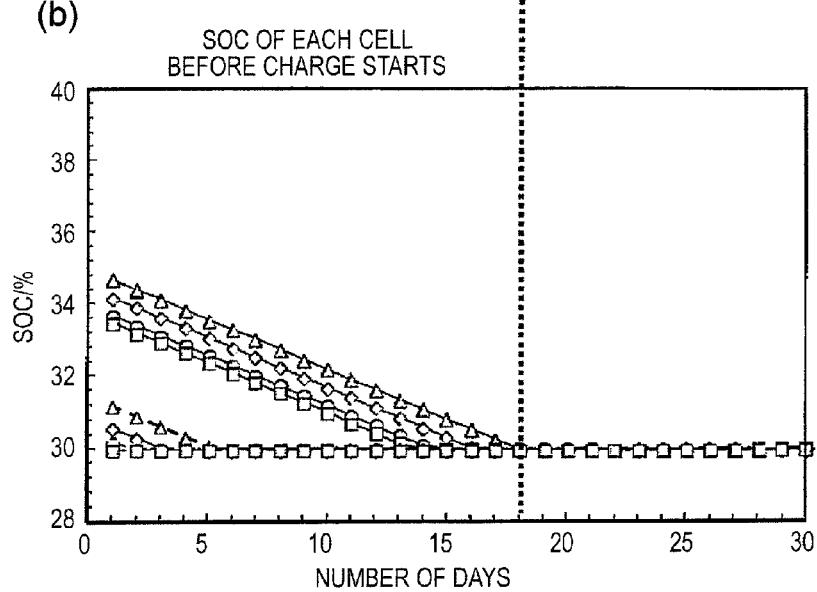

FIGS. 25 and 26 illustrate the state of the voltage equalization when a voltage fluctuation occurs in eight cells 111 that constitute the battery pack 110. In the present embodiment, unlike the first embodiment, it is possible to realize voltage equalization just by the discharge means 1. Hereinafter, a method of eliminating the voltage or SOC fluctuation will be described.

FIG. 25 illustrates the state of the voltage equalization according to the present embodiment. The SOCs of all of the eight cells 111 after the battery device stops fluctuate as illustrated at the top right corner of FIG. 25.

Here, during stopping of the battery device, the cell control means 121 that monitors the adjustment target cell 111 operates in the normal mode based on the discharge ending condition which is the period required for securing a predetermined discharge amount, calculated according to Expression (3-2) and performs voltage equalization. Moreover, as illustrated at the center of the right side of FIG. 25, the cell control means 121 transition to the power-saving mode sequentially starting with the cell control means 121 in which the adjustment has ended. By doing so, after the end of the adjustment, the voltages of all cells 111 can be equalized as illustrated at the bottom right corner of FIG. 25.

FIG. 26 illustrates an operation example of the charging by the motor generator 410 or the charger 420 when a voltage fluctuation occurs between the cells 111 that are monitored by the cell control means 121. After receiving the vehicle stop signal, the battery pack control means 150 extracts the smallest voltage value from the cell voltages of the cells 111 that constitute the battery pack 110 and set the smallest voltage value as a target voltage value. The voltages of the cells 111 monitored by the cell control means 121 are compared with the target voltage value, and cells 111 having voltages higher than the target voltage are determined as discharge target cells. Here, a value "0" is set to the operation mode management circuit 127 of the cell control means 121 that monitors the cells 111 of which the voltage is already lower than the target voltage, or a power-saving mode transition command is transmitted to the cell control means 121. On the other hand, only the cell control means 121 that monitors the cells 111 having voltages higher than the target voltage continues operating in the normal mode to discharge the discharge target cells 111, and the cell control means transition to the power-saving mode sequentially starting with the cell control means that monitors the cell 111 in which the discharge has ended. As a result, even after the operation of the battery pack control means 150 has stopped, the cell control means 121 can manage the cells 111 so that the cell voltages of the cells 111 do not exceed the target voltage continuously.

When the voltage equalization is performed in the above-described method, it is possible to perform voltage equalization accurately even after the battery device of the vehicle stops. Moreover, even if the battery pack 110 includes cells 111 of which the full-charge capacities are different, when the discharge ending condition 1 is set according to the method described in the first embodiment, it is possible to perform voltage equalization within an intended SOC range.

FIGS. 27(a) and 27(b) illustrate the results of an estimation of the number of days required for SOC equalization with the same cycle as used in the method described in FIG. 14 according to the first embodiment. In this simulation, one cell control means 121 is allocated to one cell 111, and a discharge circuit that includes the bypass switch 122 and the bypass resistor 123 is not provided. That is, the voltage equalization is performed only during the stop period of the vehicle. FIG. 27(a) illustrates a change of the SOCs of the respective cells 111 after the end of the charging, and FIG. 27(b) illustrates a change of the SOCs of the respective cells immediately before the changing starts. The vertical axis in the figure represents the SOC (%), and the horizontal axis represents the number of days.

Figure 15:
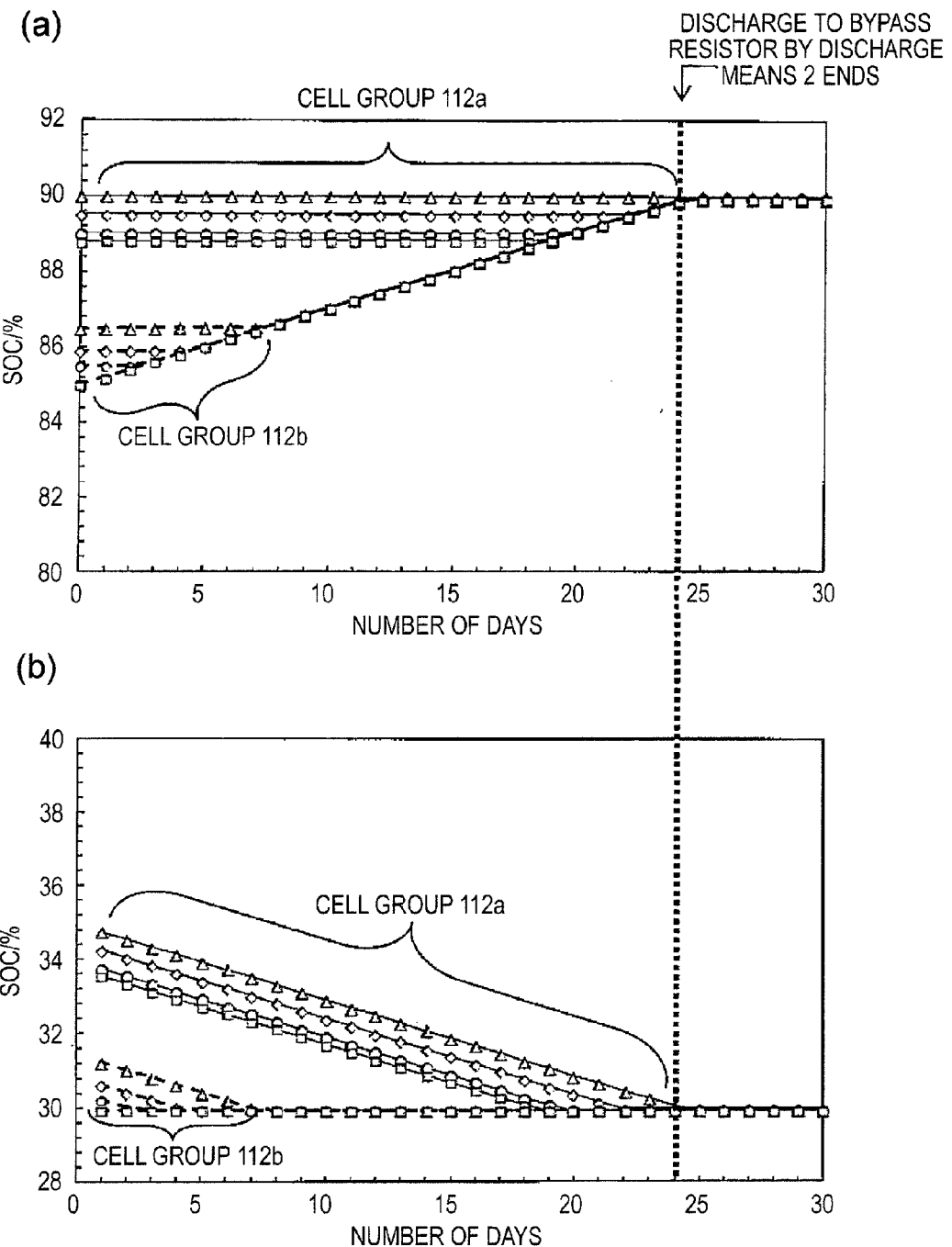
FIG. 15 is a diagram of simulation results illustrating the state of SOC equalization when voltage equalization is performed only during travelling of a vehicle.
Figure 16:
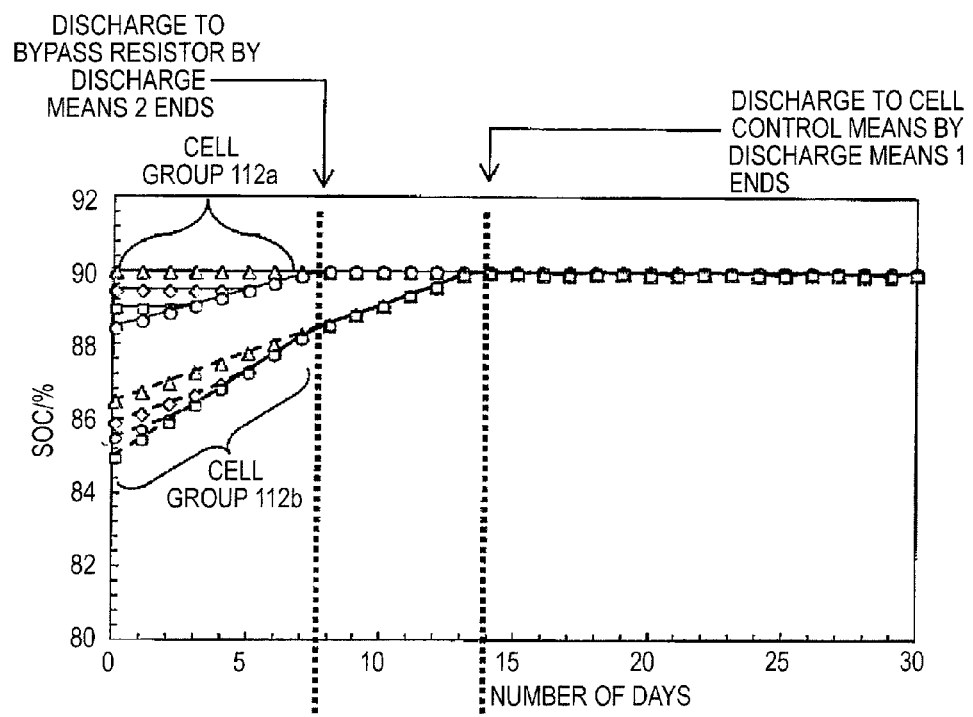
FIG. 16 is a simulation diagram illustrating the state of SOC equalization when voltage equalization is performed during a stop period in addition to during travelling of a vehicle.
Figure 16:
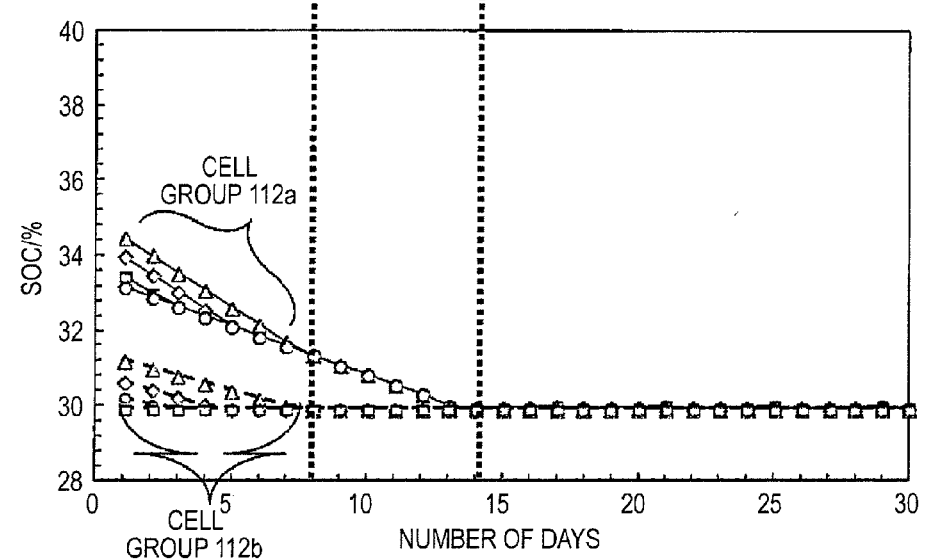

In the present embodiment, similarly to FIGS. 15 and 16 of the first embodiment, it can be understood that all cells 111 that constitute the battery pack 110 approach the intended upper-limit SOC for charging after the end of the charging, and all cells 111 that constitute the battery pack 110 approach the lower-limit SOC for the discharge immediately before the charging starts. As understood from the figures, the number of days required for the SOC equalization is 18 days, and it is possible to decrease the number of days required for the SOC equalization as compared to 24 days (FIG. 15) for the case where the voltage equalization is performed only during travelling of the vehicle.

According to the present embodiment, just by setting the power-saving mode transition condition of the cell control means 121, it is possible to manage the cell voltages or SOCs of the cells 111. Thus, it is possible to realize a battery control circuit or a battery device capable of controlling the battery pack 110 with a simple process and a small number of commands.

Fourth Embodiment

Figure 28:
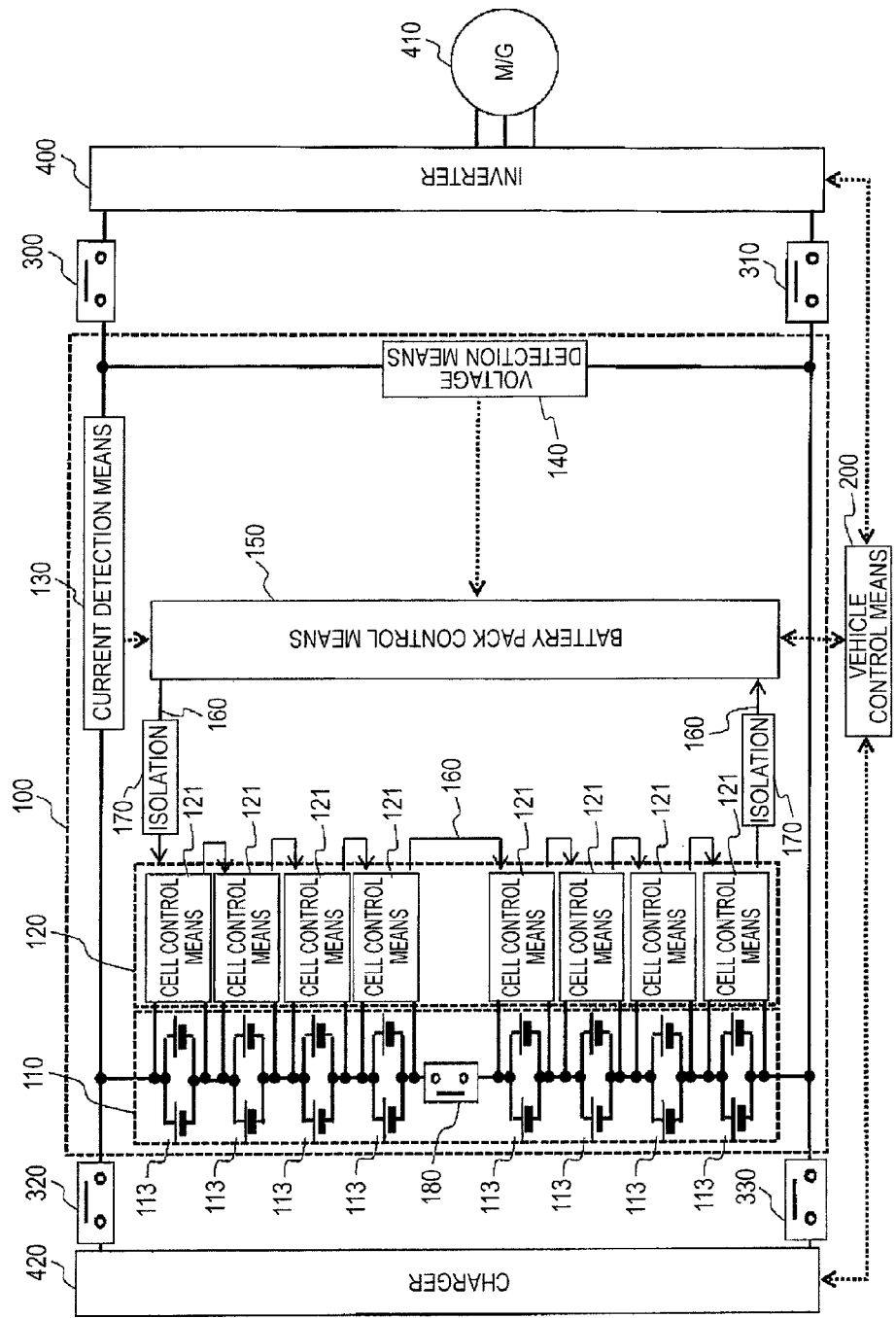
FIG. 28 is a block diagram illustrating a configuration example of a battery device of a plug-in hybrid vehicle according to the present invention.
Figure 29:
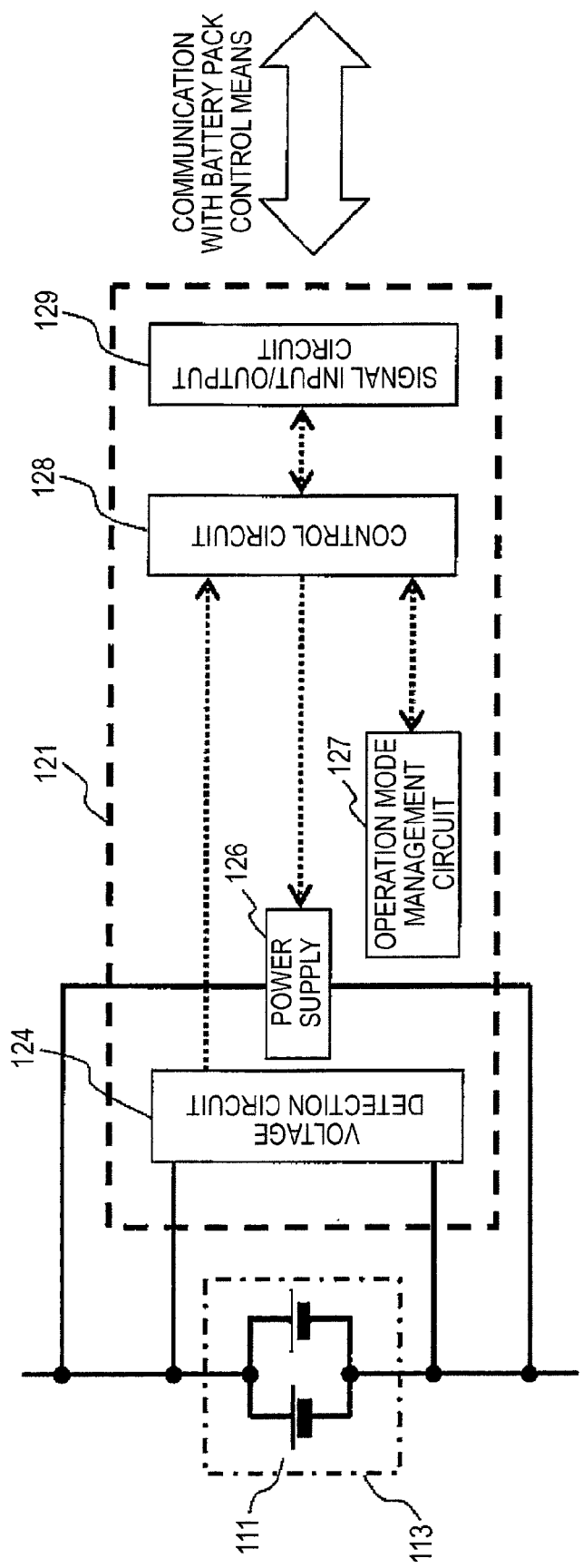
FIG. 29 is a block diagram illustrating a circuit configuration of the cell control means.

The fourth embodiment of the present invention will be described with reference to FIGS. 28 and 29. FIG. 28 is a diagram illustrating a configuration example of a battery device including a driving system of a plug-in hybrid vehicle according to the present embodiment. FIG. 29 is a circuit configuration diagram of the cell control means 121.

The present embodiment is different from the third embodiment in that eight groups of parallel cells 113 in which two cells 111 are electrically connected in parallel are electrically connected in series to form the battery pack 110.

A method of determining the discharge ending condition according to the present embodiment will be described. In the present embodiment, similarly to the third embodiment, the discharge of the cells 111 is performed only by the discharge means 1.

The method of determining the discharge ending condition 1 according to the present embodiment will be described. In description of the computation formula applied to determine the discharge ending condition 1, the number 8 of parallel cells 113 is substituted with N.

The first method of determining the discharge ending condition 1 according to the present embodiment is the same as that of the third embodiment.

The second method of determining the discharge ending condition 1 according to the present embodiment will be described. First, the SOC is estimated based on a correlation between SOC and OCV from the OCV measurement results of the parallel cells 113 that constitute the battery pack 110, the detection results and a difference $\Delta SOC3$ between the SOCs of the parallel cells 113 that constitute the battery pack 110 and an intended SOC (target SOC) are calculated according to Expression (3-1). A period t3' required for adjustment is calculated from the calculated $\Delta SOC3$ according to Expression (3-2') below.

[Mathematical Formula 11]

$$\begin{rcases} t3_1' = (\Delta SOC3_1 \times Q\max_1)/I_C \times 2 \\ t3_2' = (\Delta SOC3_2 \times Q\max_2)/I_C \times 2 \\ t3_3' = (\Delta SOC3_3 \times Q\max_3)/I_C \times 2 \\ \vdots \\ t3_N' = (\Delta SOC3_N \times Q\max_N)/I_C \times 2 \end{rcases} \quad (3\text{-}2')$$

Here, Qmax represents a full-charge capacity [Ah] of the cell 111, and $I_C$ represents the consumption current [A] of the cell control means 121. Similarly to the second embodiment, the number (in the present embodiment, 2) of cells 111 that constitute the parallel cell 113 is multiplied. The discharge parallel cell 113 is discharged based on the result of Expression (3-2'), and the discharge ends when the period required for securing a predetermined discharge amount has elapsed.

The operation of the battery device according to the present embodiment is the same as the operation (FIG. 21) of the battery device according to the third embodiment.

The operation of the battery pack control means 150 according to the present embodiment is the same as the operation (FIG. 22) of the battery pack control means 150 according to the third embodiment.

The operation of the cell control means 121 according to the present embodiment is the same as the operation (FIG. 23) of the cell control means 121 according to the third embodiment.

According to the present invention, since the SOCs of the two cells 111 that constitute the parallel cell 113 are the same in the no-load condition, it is possible to obtain the same effects as the third embodiment.

Fifth Embodiment

Figure 30:
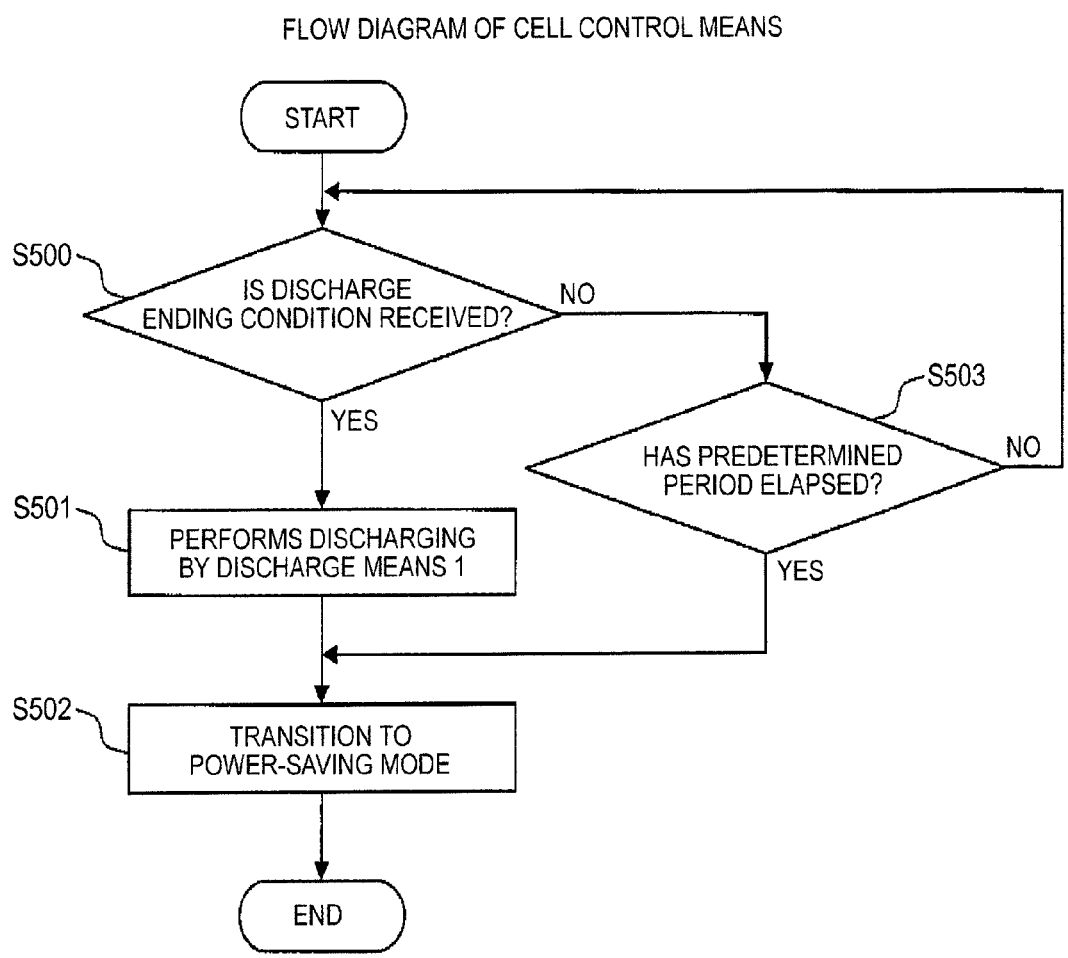
FIG. 30 is a flowchart for explaining an operation example of the cell control means.

The fifth embodiment of the present invention will be described with reference to FIG. 30. The present embodiment can be applied to a battery device 100 that includes cell control means 121 that operates with electricity supplied from cells 111 so as to monitor the state of the cells 111.

The present embodiment includes a function of allowing the cell control means 121 to automatically transition to the power-saving mode when a communication error occurs between the battery pack control means 150 and the cell control means 121, and it is not possible to receive the discharge ending condition accurately. The operation of the battery pack control means 150 according to the present embodiment is the same as that illustrated in FIG. 7 or 22.

The operation of the cell control means 121 according to the present embodiment will be described with reference to FIG. 30. The flowchart of the cell control means 121 in FIG. 30 illustrates the operation of the cell control means 121 after the battery device 100 receives the vehicle stop signal, and the discharge ending condition is computed by the battery pack control means 150.

First, in Step 500, it is determined whether the discharge ending condition is received from the battery pack control means 150.

When the discharge ending condition is accurately received, the flow proceeds to Step 501, and the discharge means 1 performs voltage equalization. After that, when the voltage equalization ends, the flow proceeds to Step 502, and the cell control means 121 transitions to the power-saving mode.

When it is not possible to receive the discharge ending condition in Step 500, the flow proceeds to Step 503. In Step 503, it is determined whether a predetermined period has elapsed after the vehicle stops. When it is determined in Step 503 that the predetermined period has not elapsed, the flow returns to Step 500, and it is determined again whether the discharge ending condition 1 has been received.

When it is determined in Step 503 that the predetermined period has elapsed, it is determined that a communication error has occurred between the battery pack control means 150 and the cell control means 121, and it was not possible for the cell control means 121 to receive the discharge ending condition accurately. Then, the flow proceeds to Step 502, and the cell control means 121 proceeds to the power-saving mode.

According to the present embodiment, even when a communication error occurs between the battery pack control means 150 and the cell control means 121, it is possible to prevent the cell control means 121 from operating continuously and to prevent the cells 111 from entering an over-discharged state.

Sixth Embodiment

The sixth embodiment of the present invention will be described.

In the present embodiment, a fluctuation resulting from an individual difference of the consumption current required for the operation of the cell control means 121 is focused. Depending on the cell control means 121, there may be one having a small consumption current and one having a large consumption current. Since the cell control means 121 operates with the energy supplied from the cell groups 112 as in FIG. 2 or the cells 111 as in FIG. 20, when the individual difference of the consumption current of the cell control means 121 is large, a voltage or SOC fluctuation of the cell groups 112 or the cells 111 may occur due to the individual difference.

Thus, the consumption current fluctuation of the cell control means 121 is measured in advance when producing the cell control means 121 and the measurement results are stored in the battery pack control means 150. The battery pack control means 150 substitutes the consumption current values $I_C$ of Expressions (2-3), (2-5), (2-3'), (2-5'), (3-2), and (3-2') with the consumption current values of the respective cell control means 121 using the consumption current values stored in advance and calculates the period required for securing the predetermined discharge amount. Moreover, the battery pack control means 150 transmits the period required for securing the predetermined discharge amount to the cell control means 121. After that, the battery pack control means 150 proceeds to the power-saving mode, and the cell control means 121 operates in the normal mode for the period calculated by the battery pack control means 150 and proceeds to the power-saving mode. By doing so, it is possible to manage SOCs by suppressing the influence on the voltage or SOC fluctuation, of the consumption current fluctuation due to the individual difference of the cell control means 121.

In the above description, although the information on the consumption current fluctuation is stored in the battery pack control means 150, the cell control means 121 may store individual consumption current values. In such a case, after the vehicle stop signal is received, the consumption current values stored in the cell control means 121 may be transmitted to the battery pack control means 150 together with the information on the cells 111. The battery pack control means 150 having received the information on the cell control means 121 substitutes the consumption current values $I_C$ in Expressions (2-3), (2-5), (2-3'), (2-5'), (3-2), and (3-2') with the consumption current values of the respective cell control means 121 and calculates the period required for securing the predetermined discharge amount. The battery pack control means 150 transmits the period required for securing the predetermined discharge amount to the cell control means 121 and proceeds to the power-saving mode. Moreover, the cell control means 121 operates in the normal mode for the period calculated by the battery pack control means 150 to perform the discharge of the cells 111. In this way, it is possible to manage SOCs while suppressing the influence on the SOC fluctuation, of the consumption current fluctuation resulting from the individual difference of the cell control means 121.

The present embodiment can be applied to a battery device that includes the cell control means 121 that operates with the electricity supplied from the cells 111 so as to monitor the state of the cells 111.

Seventh Embodiment

Figure 32:
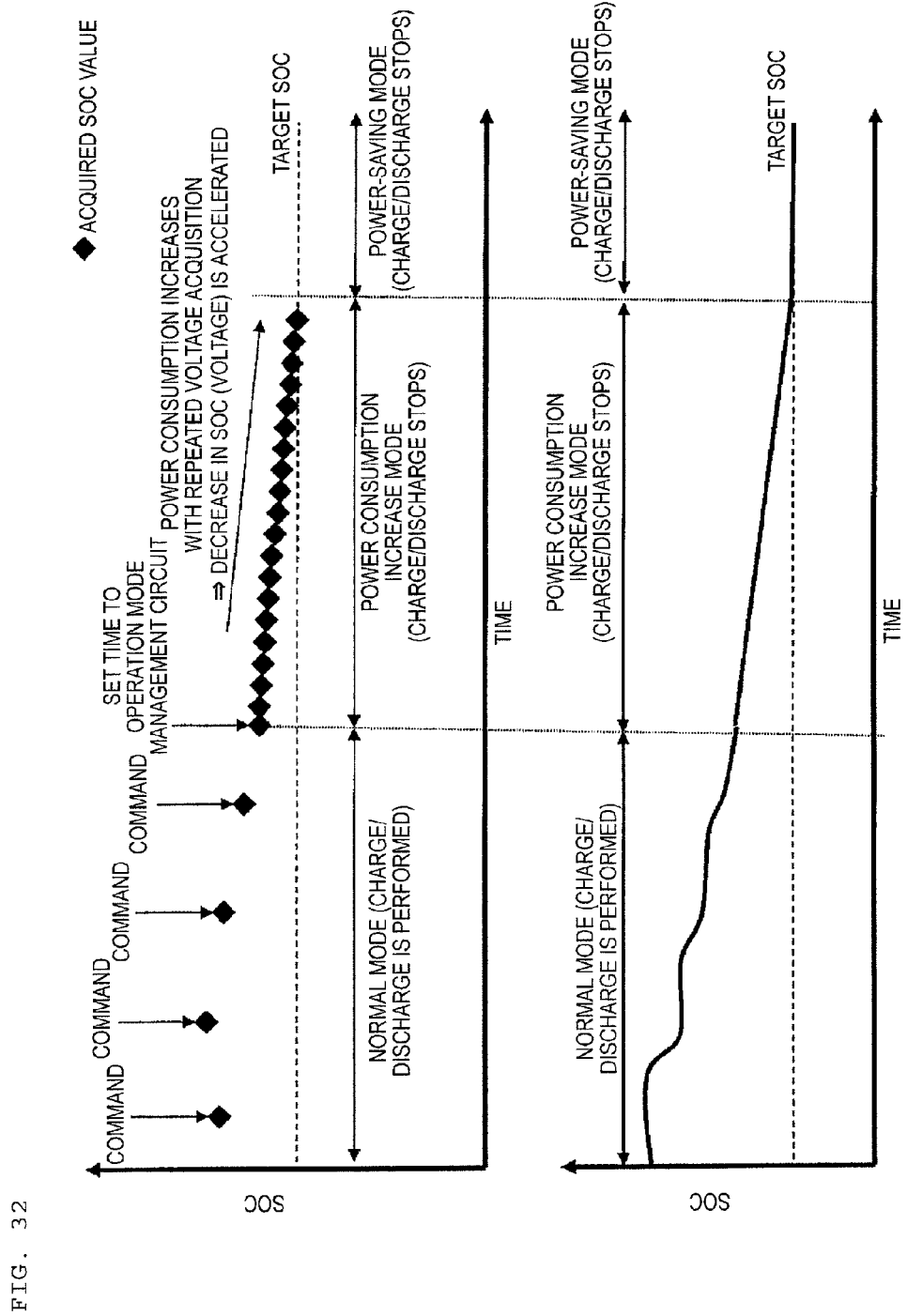
FIG. 32 is a diagram for explaining a method of increasing a consumption current by changing a sampling speed of a voltage detection circuit.
Figure 33:
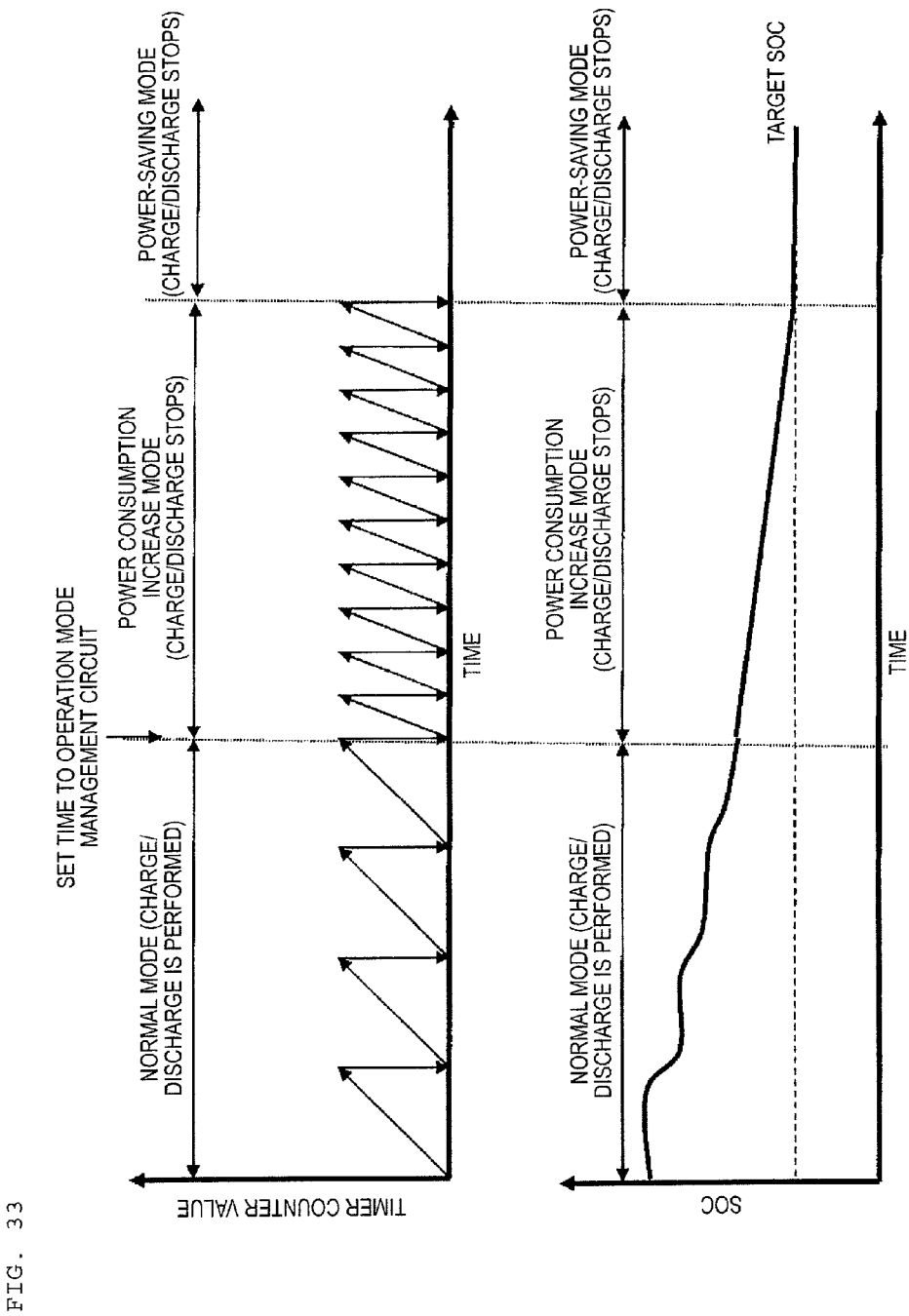
FIG. 33 is a diagram for explaining a method of increasing a consumption current by changing the cycle of a timer.

The seventh embodiment of the present invention will be described with reference to FIGS. 31 to 33.

The battery device 100 according to the present embodiment has a function of changing the operation so that the consumption power of the cell control means 121 that monitors a cell 111 in which the SOC fluctuation is large to thereby accelerate elimination of the voltage or SOC fluctuation.

Figure 31:
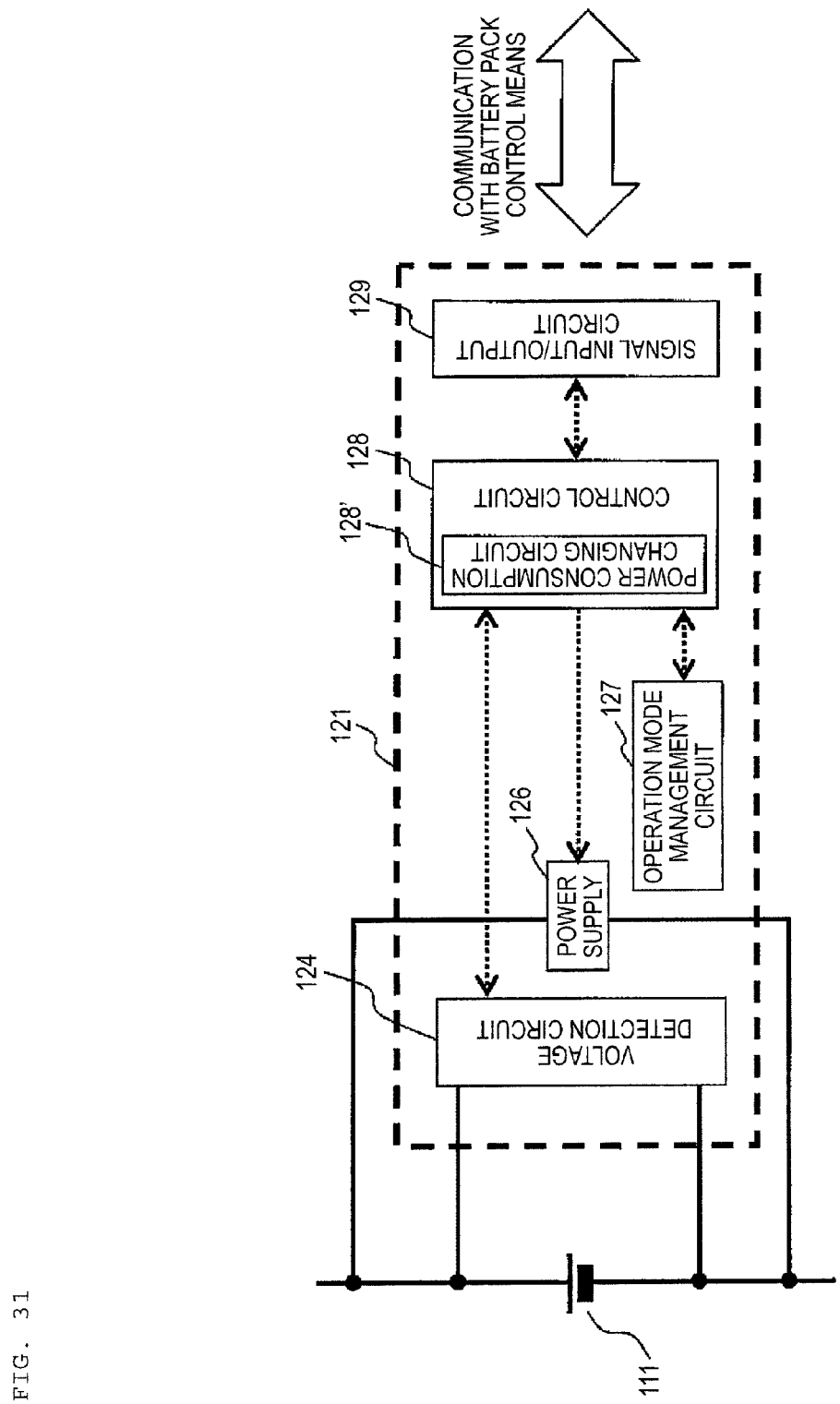
FIG. 31 is a block diagram illustrating a circuit configuration of the cell control means.

FIG. 31 illustrates a circuit configuration of the cell control means 121 according to the present embodiment. In the present embodiment, a configuration in which a power consumption changing circuit 128' is added to the circuit of the cell control means 121 illustrated in FIG. 20, and one cell control means 121 is provided to one cell 111 will be described as an example. Moreover, it is assumed that the voltage detection circuit 124 of this example starts acquiring the voltages of the cells 111 based on a command from the battery pack control means 150.

The power consumption changing circuit 128' illustrated in FIG. 31 changes a sampling speed of the voltage detection circuit 124 during a period in which the cell control means 121 receives the discharge ending condition from the battery pack control means 150 and sets the time information within the signal to the operation mode management circuit 127, and the cell control means 121 continues operating in the normal mode until the set period elapses.

The operation of the voltage detection circuit 124 according to the present embodiment will be described with reference to FIG. 32. In the present embodiment, in a period in which the time information is set to the operation mode management circuit 127, and the cell control means 121 continues operating in the normal mode until the set period elapses, even when there is no command from the battery pack control means 150, the voltage detection circuit 124 proceeds to a mode in which the voltages of the cells 111 are continuously detected. Moreover, when the time set to the operation mode management circuit 127 has elapsed, the cell control means 121 proceeds to the power-saving mode, and the operation of the voltage detection circuit 124 also stops.

By changing the operation of the voltage detection circuit 124 based on the above-described power consumption changing circuit 128', the operation can be changed so that the consumption current of the cell control means 121 increases. Thus, the energy consumed by the cells 111 which are the targets to be managed by the cell control means 121 can be increased as compared to the normal case. As a result, it is possible to decrease the SOCs or voltages of the cells 111 in a relatively short period. By using the cell control means 121 according to the present embodiment, it is possible to prevent the cells 111 from remaining in the state where the voltage thereof exceeds the target SOC as illustrated in FIG. 9 in a relatively short period. Further, it is also possible to shorten the period required for the voltage or SOC equalization of all cells 111 using the cell control means 121 as in FIG. 11.

The power consumption changing circuit 128' included in the cell control means 121 according to the present embodiment may change the cycle of a timer included in the cell control means 121. The change of the cycle of the timer included in the cell control means 121 will be described with reference to FIG. 33. The cell control means 121 includes a plurality of timers in order to control the sampling timing of the signal input/output circuit 129. When the period in which the operation in the normal mode is maintained is set to the operation mode management circuit 127, the power consumption changing circuit 128' changes the operation cycle of at least one of the timers included in the cell control means 121. In this way, since the consumption current of the cell control means 121 tends to increase, the energy consumed by the management target cells 111 increases. As a result, the decrease in the SOC or voltage of the cells 111 tends to be accelerated. In this way, it is possible to prevent the cells 111 from remaining in the state in which the voltages thereof exceed the target SOC of FIGS. 9 and 24 and to shorten the period required for the SOC equalization of all cells 111 using the cell control means 121 as in FIGS. 11 and 26.

In the present embodiment, although a configuration in which one cell control means 121 is provided to one cell 111 has been described as an example, one cell control means 121 may be provided to a plurality of cells 111. In this case, by the function of the power consumption changing circuit 128' of the present embodiment, it is possible to accelerate the decrease in the SOC or voltage of the management target cell group 112.

As described above, by using the cell control means 121 according to the present embodiment, it is possible to prevent the cells 111 from remaining in the state in which the SOC or voltage thereof exceeds the target SOC or the target voltage and to shorten the period required for the SOC equalization of all cells 111.

In the present embodiment, although the two method, a method of changing the sampling speed of the cell voltage and a method of changing the cycle of the timer have been described as a method of increasing the consumption current, the method is not limited to these methods. Moreover, both methods may be used together.

Moreover, the present embodiment can be applied to a battery device that includes the cell control means 121 that operated with the electricity supplied from the cells 111 so as to monitor the state of the cells 111.

The respective embodiments described above may be combined with one or a plurality of modification examples. The modification examples may be appropriately combined with each other.

The above description is an example only, and the present invention is not limited to the configurations of the above embodiments.

REFERENCE SIGNS LIST

100: BATTERY DEVICE
110: BATTERY PACK
111: CELL
112: CELL GROUP
120: CELL MANAGEMENT MEANS
121: CELL CONTROL MEANS
122: BYPASS RESISTOR
123: BYPASS SWITCH
124: VOLTAGE DETECTION CIRCUIT
125: BSW DRIVING CIRCUIT
126: POWER CIRCUIT
127: OPERATION MODE MANAGEMENT CIRCUIT
128: CONTROL CIRCUIT
128": POWER CONSUMPTION CHANGING CIRCUIT
129: SIGNAL INPUT/OUTPUT CIRCUIT
130: CURRENT DETECTION MEANS
140: VOLTAGE DETECTION MEANS
150: BATTERY PACK CONTROL MEANS
160: SIGNAL COMMUNICATION MEANS
170: INSULATOR
200: VEHICLE CONTROL MEANS
400: INVERTER
410: MOTOR GENERATOR
420: CHARGER

The invention claimed is:
1. A battery control circuit comprising:
a plurality of cell control devices each powered by electricity supplied from a plurality of battery groups, wherein each cell control device is configured to:
collect information on the battery groups,
monitor and control a state of individual batteries within the battery groups, and
control a consumption current that consumes the electricity by changing a sampling speed that the information is collected on the battery groups, wherein the battery groups are connected in series to form a battery unit; and
a battery unit control device, wherein the battery unit control device is configured to:
control the plurality of cell control devices;
determine whether each of the plurality of cell control devices is operating in a Normal Mode or an Operation Mode;
receive received information from the plurality of cell control devices, wherein the received information includes a charge state of the battery groups;
determine if the battery control circuit is charging;
compare the received information from each of the plurality of cell control devices to a predetermined charged state; and
increase the consumption current for each of the plurality of cell control devices in the Normal Mode, if the battery control circuit is not charging and the received informa- tion from the cell control devices is greater than the predetermined charge state.

2. The battery control circuit according to claim 1, wherein the battery unit control device is further configured to:
determine if a discharge ending condition of the batteries that are monitored by the plurality of cell control devices has occurred,
transmit the discharge ending condition to the plurality of cell control devices if the battery control circuit is not charging and it is determined that the discharge ending condition has occurred, and
enter a power-saving mode if the battery control circuit is not charging and it is determined that the discharge ending condition has occurred.

3. The battery control circuit according to claim 2, wherein the plurality of cell control devices is configured to adjust the charged state based on the discharge ending condition transmitted from the battery unit control device and allow the cell control device to transition to the power-saving mode sequentially starting with the cell control device in which the adjustment has ended.

4. The battery control circuit according to claim 2, wherein the battery unit control device is further configured to determine the discharge ending condition based on a consumption current value that is stored in advance for each of the plurality of cell control devices.

5. The battery control circuit according to claim 1, further comprising:
a voltage equalization circuit that includes a bypass resistor and a bypass switch that are connected in parallel to each of the batteries that constitute a monitoring target battery group, and
when the charged state of the batteries that constitute the battery group is higher than the predetermined charged state, the cell control device discharges the battery having the high charged state using the voltage equalization circuit to thereby decrease the charged state.

6. The battery control circuit according to claim 1, wherein the battery unit control devices are further configured to determine a discharge ending condition of the batteries that are monitored by the plurality of cell control devices, and
the cell control devices are further configured to:
receive the discharge ending condition transmitted from the battery unit control device,
adjust the charged state based on the received discharge ending condition, and
transition to a power-saving mode when the discharge ending condition is not received within a predetermined period after the charging and discharge of the battery unit has stopped.

7. The battery control circuit according to claim 1, wherein the cell control device includes a mode in which a consumption current required for the operation of the cell control device is increased, and transitions to the mode when the operation of the cell control device continues to thereby accelerate a decrease in the charged state.

8. A battery control circuit comprising:
a plurality of cell control devices each powered by electricity supplied from a plurality of batteries that are connected in series to form a battery unit, wherein each cell control device is configured to:
collect information on the battery unit,
monitor and control a state of individual batteries within the battery unit, and
control a consumption current that consumes the electricity by changing a sampling speed that the information is collected on the battery unit; and
a battery unit control device, wherein the battery unit control device is configured to:
control the plurality of battery control devices;
determine whether each of the plurality of cell control devices is operating in a Normal Mode or an Operation Mode;
receive received information from the plurality of cell control devices, wherein the received information includes a charge state of the battery;
determine if the battery control circuit is charging;
compare the received information from each of the plurality of cell control devices to a predetermined charged state; and
increase the consumption current for each of the plurality of cell control devices in the Normal Mode if the battery control circuit is not charging and the received information from the cell control devices is greater than the predetermined charge state.

9. The battery control circuit according to claim 8, wherein the battery unit control device is further configured to:
determine a discharge ending condition of the batteries that are monitored by the plurality of cell control devices,
transmit the discharge ending condition to the plurality of cell control devices, and
enter a power-saving mode if the battery control circuit is not charging and it is determined that a discharge ending condition has occurred.

10. The battery control circuit according to claim 8, wherein
the battery unit control device is further configured to determine a discharge ending condition of the batteries that are monitored by the plurality of cell control devices, and
the battery control devices are further configured to:
receive the discharge ending condition transmitted from the battery unit control device,
adjust the charged state based on the received discharge ending condition, and
transition to a power-saving mode when the discharge ending condition is not received within a predetermined period after the charging and discharge of the battery unit has stopped.

11. The battery control circuit according to claim 8, wherein
the battery control circuit has a mode in which a consumption current required for the operation of the cell control device is increased, and transitions to the mode when the operation of the cell control device continues to thereby accelerate a decrease in the charged state.

12. A battery device comprising:
a battery unit to which a plurality of battery groups are connected in series, each battery group including a plurality of batteries;
a plurality of cell control devices, each powered by electricity supplied from one of the plurality of battery groups, wherein each cell control device is configured to:
collect information on the battery groups,
monitor and control a state of individual batteries within the battery groups, and
control a consumption current that consumes the electricity by changing a sampling speed that the information is collected on the battery groups; and a battery unit control device, wherein the battery unit control device is configured to:
control the plurality of cell control devices;
determine whether each of the plurality of cell control devices is operating in a Normal Mode or an Operation Mode;
receive received information from the plurality of cell control devices, wherein the received information includes a charge state of the battery groups;
determine if the battery device is charging;
compare the received information from each of the plurality of cell control devices to a predetermined charged state; and
increase the consumption current for each of the plurality of cell control devices in the Normal Mode if the battery device is not charging and the received information from the cell control devices is greater than the predetermined charge state.

13. The battery device according to claim 12, wherein the battery unit control device is further configured to:
determine a discharge ending condition of the batteries that are monitored by the plurality of cell control devices,
transmit the discharge ending condition to the plurality of cell control devices, and
enter a power-saving mode if the battery device is not charging and it is determined that a discharge ending condition has occurred.

14. The battery device according to claim 13, wherein the plurality of cell control devices are further configured to adjust the charged state based on the discharge ending condition transmitted from the battery unit control device and allow the cell control devices to transition to the power-saving mode sequentially starting with the cell control device in which the adjustment has ended.

15. The battery device according to claim 13, wherein the battery unit control device is further configured to determine the discharge ending condition based on a consumption current value that is stored in advance for each of the plurality of cell control devices.

16. The battery device according to claim 12, further comprising:
a voltage equalization circuit that includes a bypass resistor and a bypass switch that are connected in parallel to each of the batteries that constitute a monitoring target battery group, and
when the charged state of the batteries that constitute the battery group is higher than the predetermined charged state, the cell control device discharges the battery having the high charged state using the voltage equalization circuit to thereby decrease the charged state.

17. A battery device comprising:
a battery unit that includes a plurality of batteries are electrically connected in series;
a plurality of cell control devices that are powered by electricity supplied from the batteries in the battery unit, wherein each cell control device is configured to:
collect information on the battery unit,
monitor and control a state of individual batteries within the battery unit, and
control a consumption current that consumes the electricity by changing a sampling speed that the information is collected on the battery unit; and
a battery unit control device, wherein the battery unit control device is configured to:
determine whether each of the plurality of cell control devices is operating in a Normal Mode or an Operation Mode;
receive received information from the plurality of cell control devices, wherein the received information includes a charge state of the battery;
determine if the battery device is charging;
compare the received information from each of the plurality of cell control devices to a predetermined charged state; and
increase the consumption current for each of the plurality of cell control devices in the Normal Mode if the battery device is not charging and the received information from the cell control device is greater than the predetermined charge state.

18. The battery device according to claim 12 or 17, wherein the battery unit control device includes a mode in which a consumption current required for the operation of the cell control device is increased, and transitions to the mode when the operation of the cell control device continues to thereby accelerate a decrease in the charged state.

19. The battery device according to claim 12 or 17, wherein the battery unit control device is further configured to determine a discharge ending condition of the batteries that are monitored by the plurality of cell control devices, and
the cell control devices are further configured to:
receive the discharge ending condition transmitted from the battery unit control device,
adjust the charged state based on the received discharge ending condition, and
transition to a power-saving mode when the discharge ending condition is not received within a predetermined period after the charging and discharge of the battery unit has stopped.

20. The battery device according to claim 17, wherein the battery unit control device is further configured to:
determine a discharge ending condition of the batteries that are monitored by the plurality of cell control devices,
transmit the discharge ending condition to the plurality of cell control devices, and
enter a power-saving mode if the battery device is not charging and it is determined that a discharge ending condition has occurred.

* * * * *